US011409952B2

(12) United States Patent
Laupretre et al.

(10) Patent No.: US 11,409,952 B2
(45) Date of Patent: Aug. 9, 2022

(54) SYSTEM AND METHOD FOR COLLABORATIVE INK MANAGEMENT

(71) Applicant: MyScript, Nantex (FR)

(72) Inventors: Pierre Laupretre, Nantes (FR); Pierre-Alban Dewitte, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 15/417,599

(22) Filed: Jan. 27, 2017

(65) Prior Publication Data
US 2018/0052813 A1    Feb. 22, 2018

(30) Foreign Application Priority Data
Aug. 16, 2016  (EP) .................................... 16290151

(51) Int. Cl.
*G06F 17/00* (2019.01)
*G06F 40/171* (2020.01)
(Continued)

(52) U.S. Cl.
CPC ............ *G06F 40/171* (2020.01); *G06V 10/95* (2022.01); *G06V 30/32* (2022.01); *H04L 65/403* (2013.01)

(58) Field of Classification Search
CPC ............ G06F 17/241; G06F 17/30896; G06F 3/04883; G06F 40/171; G06K 9/00402; G06K 9/00979; H04L 65/403
See application file for complete search history.

(56) References Cited

U.S. PATENT DOCUMENTS

| 5,826,025 A | 10/1998 | Gramlich |
| 6,292,857 B1 | 9/2001 | Sidoroff et al. |

(Continued)

FOREIGN PATENT DOCUMENTS

| JP | 2004536412 A | 12/2004 |
| JP | 2005049982 A | 2/2005 |

(Continued)

OTHER PUBLICATIONS

Keshari et al., Sharing Digital Ink in Heterogeneous Collaborative Environments, Citeseer, 2008, pp. 1-6 (Year: 2008).*

(Continued)

*Primary Examiner* — Andrew T McIntosh
(74) *Attorney, Agent, or Firm* — McDermott Will and Emery LLP

(57) ABSTRACT

A system, method and computer program product for use in managing collaboration on documents having digital ink on a network of computing devices is disclosed. Each computing device has a processor and at least one system application for processing handwriting input under control of the processor. The system application displays, on a display associated with one of the computing devices, a document having digital ink based on a journal of the document, defines the journal to have journal entries associated with at least handwriting input to the document represented by the digital ink, and communicates the journal entries of the journal with one or more of the other networked computing devices displaying the document. The handwriting input associated with the journal entries is handwriting input to the document via the input interface of any of the computing devices displaying the document based on the communicated journal entries.

15 Claims, 38 Drawing Sheets

(51) Int. Cl.
  *H04L 65/403* (2022.01)
  *G06V 10/94* (2022.01)
  *G06V 30/32* (2022.01)

(56) References Cited

U.S. PATENT DOCUMENTS

| | | | |
|---|---|---|---|
| 6,342,906 | B1 | 1/2002 | Kumar et al. |
| 7,865,816 | B2 | 1/2011 | Tanaka |
| 8,108,779 | B1 | 1/2012 | Rein et al. |
| 8,918,721 | B2 | 12/2014 | Sitrick et al. |
| 9,330,366 | B2 | 5/2016 | Sitrick et al. |
| 2009/0276471 | A1* | 11/2009 | Baer ............ G06F 16/93 |
| 2012/0231441 | A1 | 9/2012 | Parthasarathy et al. |
| 2012/0284197 | A1 | 11/2012 | Sitrick et al. |
| 2012/0331061 | A1* | 12/2012 | Lininger ........ G06F 17/5004 709/205 |
| 2014/0088926 | A1* | 3/2014 | Rhoades ........ G06F 30/20 703/1 |
| 2014/0223334 | A1 | 8/2014 | Jensen et al. |
| 2015/0007055 | A1* | 1/2015 | Lemus ........ G06F 3/0484 715/753 |
| 2016/0379385 | A1* | 12/2016 | Tu ............ G06F 3/1454 345/441 |
| 2017/0109578 | A1 | 4/2017 | Bednarowicz et al. |
| 2017/0199660 | A1 | 7/2017 | Guiavarc'H et al. |

FOREIGN PATENT DOCUMENTS

| | | |
|---|---|---|
| JP | 2007188143 A | 7/2007 |
| JP | 2008204469 A | 9/2008 |
| JP | 2009048656 A | 3/2009 |
| JP | 2010113539 A | 1/2010 |
| JP | 2014110061 A | 6/2014 |
| JP | 2015056030 A | 3/2015 |

OTHER PUBLICATIONS

Landay et al., NotePals: Sharing and Synchronizing Handwritten Notes with Multimedia Documents, ACM Conference, 1998, pp. 1-7 (Year: 1998).*

Hu et al., A Streaming Digital Ink Framework for Multi-Party Collaboration, 2012, University of Western Ontario, pp. 1-15 (Year: 2012).*

Blagojevic et al., Using data mining for digital ink recognition: Dividing text and shapes in sketched diagrams, 2011, Computers and Graphics 35, pp. 976-991 (Year: 2011).*

International Search Report issued for PCT/EP2017/000989 dated Sep. 28, 2017 (4 pages).

Written Opinion of the International Searching Authority issued for PCT/EP2017/000989 dated Sep. 28, 2017 (7 pages).

Japanese IP Office, Official Reasons for Rejections dated Jun. 29, 2021, for related Japanese Application No. 2019-508825, English and Japanese translations, 6 pgs.

* cited by examiner

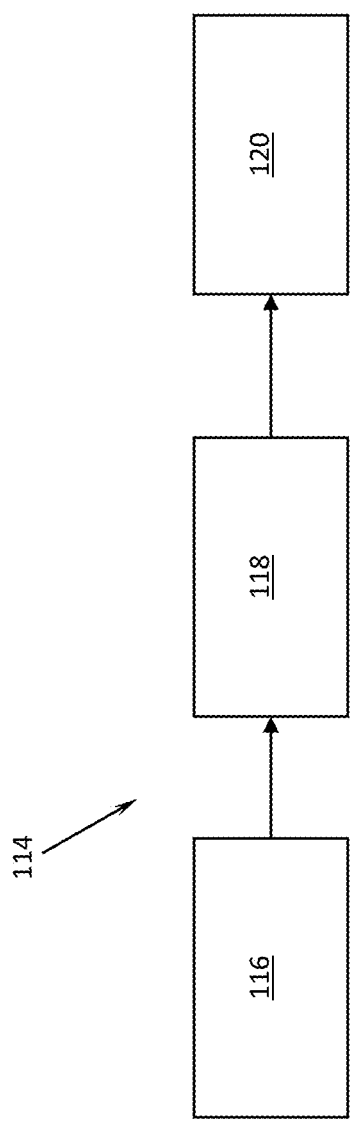

SYSTEM AND METHOD FOR COLLABORATIVE INK MANAGEMENT

CROSS-REFERENCE TO RELATED APPLICATIONS

This application claims priority to EP 16 290 151.6, filed Aug. 16, 2016, which is hereby incorporated by reference.

TECHNICAL FIELD

The present description relates generally to the field of handwriting recognition systems and methods using computing device interfaces. The present description relates more specifically to systems and methods for document collaboration using handwritten input.

BACKGROUND

Computing devices continue to become ubiquitous to daily life. They take the form of computer desktops, laptop computers, tablet computers, hybrid computers (2-in-1s), e-book readers, mobile phones, smartphones, wearable computers, global positioning system (GPS) units, enterprise digital assistants (EDAs), personal digital assistants (PDAs), game consoles, and the like. Further, computing devices are being incorporated into education settings, such as with interactive whiteboards, vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input interface that senses gestures made by a user above the input interface. A further input device is a position detection system which detects the relative position of either touch or non-touch interactions with a non-touch physical or virtual surface.

With such computing devices, collaboration functionalities are becoming more and more a requirement in certain fields of use, such as in education and corporate affairs. Collaboration on documents and the like by users in the same location generally provides no difficulty in the creation or building of those documents, as the actors collaborate in person, such as on an interactive whiteboard. However, with the rise of the so-called "cloud", distributed computing devices are able to be used to work on the same content at different locations at the same time or over time. Such remote collaboration however leads to the potential of conflict when interaction with related content occurs.

Such conflicts have been conventionally handled by 'locking' remote editing of documents when one user is acting on that document. Whilst this mechanism is effective to eliminate conflicts, the 'active' user is typically only acting on a part of the document, such that it is excessive to lock out all other actions on any other parts of the document. U.S. Pat. No. 8,108,779 describes a collaborative editing system which does not use document locking, rather simultaneous editing is allowed and actions on the same content by more than one user are detected and communicated between the user so that conflicts can be resolved by them. Such a system requires users to be actively involved in handling conflicts.

Other systems have been proposed to eliminate this burden on users whilst resolving conflicts. For example, U.S. Pat. No. 9,330,366 describes a system in which data layers for different users' modifications are used so that certain users' layers can be given precedence over those of other users. Similarly, US Patent Application Publication No. 2012/0231441 describes a system using supervisor and subordinate users to mediate conflicts. However, such 'master' and 'slave' systems go against the spirit of collaboration, as not all users are treated equally, which leads to a poor user experience or application to only those use cases facilitated by such un-equal relationships.

Collaboration is enhanced by certain input methods. For example, digital handwriting is a particularly useful input type since user input can be captured quickly and without the need for users to have high levels of software or application knowledge. Any of the above-described methods of input can be used generally for drawing or inputting text using handwriting. In such methods, the users' handwriting is interpreted using a handwriting recognition system or method.

Collaboration systems using handwriting have also been proposed. For example, U.S. Pat. Nos. 5,826,025 and 6,342,906 describe systems using annotation layers for handwritten input which are overlaid on the collaborated document. However, such systems require centralized processing, such as with a client server, to process the content and actions captured on the annotation layers. U.S. Pat. No. 7,865,816 also describes a client server approach, but using an annotation database rather than a layer structure. Such client server approaches however require reasonably complex mechanisms for arbitrating conflicts, which increases processing complexity and time, thereby impacting on user experience.

SUMMARY

The examples of the present disclosure that are described herein below provide methods, systems and a computer program product for use in managing collaboration on documents having digital ink on a network of computing devices.

In some implementations, the present disclosure provides a system for managing collaboration on documents having digital ink on a network of computing devices. Each computing device may comprise a processor and at least one non-transitory computer readable medium for processing handwriting input under control of the processor. Each at least one non-transitory computer readable medium may be configured to cause display, on a display associated with the respective computing device, of a document having digital ink based on a journal of the document, define the journal to have a plurality of journal entries associated with at least handwriting input to the document represented by the digital ink, and communicate, via the network, one or more of the journal entries of the journal with one or more of the other computing devices displaying the document, wherein the handwriting input associated with the journal entries is handwriting input to the document via the input interface of any of the computing devices displaying the document based on the communicated one or more journal entries.

Each journal entry may be defined to include identification information identifying at least that journal entry and content information on at least the handwriting input associated with that journal entry.

The journal may be defined so that links between the journal entries are formed based on the identification information of each journal entry.

Each at least one non-transitory computer readable medium may be configured to define the identification information based at least on time information on a time of the handwriting input of the respective content information, wherein each journal entry, after the initial journal entry of the journal, may be linked to one journal entry having time information in a time-order before the time information of that journal entry.

The at least one non-transitory computer readable medium of a first computing device may be configured to branch the journal into two or more branched journal entries linked to one journal entry having time information in a time-order before the time information of the branched journal entries when the branched journal entries have content information on handwriting input to the input interface of more than one of the computing devices, including the first computing device, with respect to at least a portion of the same digital ink of the document, and the time information of the branched journal entry having the content information on the handwriting input to a first input interface associated with the first computing device has a time-order after the time information of at least one of the one or more other branched journal entries.

The at least one non-transitory computer readable medium of the first computing device may be configured to link a copy of the branched journal entry having the content information on the handwriting input to the first input interface to a branched journal entry having time information in a time-order immediately before the time order of the copied branched journal entry.

In some implementations, the present disclosure provides a method for managing collaboration on documents having digital ink on a network of computing devices. Each computing device may comprise a processor and at least one non-transitory computer readable medium for processing handwriting input under control of the processor. The method may comprise displaying, on a display associated with one of the computing devices, a document having digital ink based on a journal of the document, defining the journal to have a plurality of journal entries associated with at least handwriting input to the document represented by the digital ink, and communicating, via the network, one or more of the journal entries of the journal with one or more of the other computing devices displaying the document, wherein the handwriting input associated with the journal entries is handwriting input to the document via the input interface of any of the computing devices displaying the document based on the communicated one or more journal entries.

Each journal entry may be defined to include identification information identifying at least that journal entry and content information on at least the handwriting input associated with that journal entry.

The journal may be defined so that links between the journal entries are formed based on the identification information of each journal entry.

The method may further include defining the identification information based at least on time information on a time of the handwriting input of the respective content information, wherein each journal entry, after the initial journal entry of the journal, is linked to one journal entry having time information in a time-order before the time information of that journal entry.

The method may further comprise, at the at least one non-transitory computer readable medium of a first computing device: branching the journal into two or more branched journal entries linked to one journal entry having time information in a time-order before the time information of the branched journal entries when: the branched journal entries have content information on handwriting input to the input interface of more than one of the computing devices, including the first computing device, with respect to at least a portion of the same digital ink of the document, and the time information of the branched journal entry having the content information on the handwriting input to a first input interface associated with the first computing device has a time-order after the time information of at least one of the one or more other branched journal entries.

The method may further comprise, at the at least one non-transitory computer readable medium of the first computing device, linking a copy of the branched journal entry having the content information on the handwriting input to the first input interface to a branched journal entry having time information in a time-order immediately before the time order of the copied branched journal entry.

In some implementations, the present disclosure provides a non-transitory computer readable medium having a computer readable program code embodied therein. The computer readable program code may be adapted to be executed to implement a method for managing collaboration on documents having digital ink on a network of computing devices. Each computing device may comprise a processor and at least one non-transitory computer readable medium for processing handwriting input under control of the processor. The method may comprise: displaying, on a display associated with one of the computing devices, a document having digital ink based on a journal of the document, defining the journal to have a plurality of journal entries associated with at least handwriting input to the document represented by the digital ink, and communicating, via the network, one or more of the journal entries of the journal with one or more of the other computing devices displaying the document, wherein the handwriting input associated with the journal entries is handwriting input to the document via the input interface of any of the computing devices displaying the document based on the communicated one or more journal entries.

Each journal entry may be defined to include identification information identifying at least that journal entry and content information on at least the handwriting input associated with that journal entry.

The journal may be defined so that links between the journal entries are formed based on the identification information of each journal entry.

The method may comprise defining the identification information based at least on time information on a time of the handwriting input of the respective content information, wherein each journal entry, after the initial journal entry of the journal, is linked to one journal entry having time information in a time-order before the time information of that journal entry.

The method may comprise, at a first computing device, branching the journal into two or more branched journal entries linked to one journal entry having time information in a time-order before the time information of the branched journal entries when the branched journal entries have content information on handwriting input to the input interface of more than one of the computing devices, including the first computing device, with respect to at least a portion of the same digital ink of the document, and the time information of the branched journal entry having the content information on the handwriting input to a first input interface associated with the first computing device has a time-order after the time information of at least one of the one or more other branched journal entries.

The method may comprise, at the first computing device, linking a copy of the branched journal entry having the content information on the handwriting input to the first input interface to a branched journal entry having time information in a time-order immediately before the time order of the copied branched journal entry.

BRIEF DESCRIPTION OF THE DRAWINGS

The present system and method will be more fully understood from the following detailed description of the examples thereof, taken together with the drawings. In the drawings like reference numerals depict like elements. In the drawings:

FIG. 5 shows a block diagram of a system for handwriting recognition in accordance with an example of the present system and method;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input interface on which the input to be recognized is made. Further, the use of the term 'text' in the present description is understood as encompassing all alphanumeric characters, and strings thereof, in any written language and common place non-alphanumeric characters, e.g., symbols, used in written text. Furthermore, the term 'non-text' in the present description is understood as encompassing freeform handwritten content and rendered text and image data, as well as non-alphanumeric characters, and strings thereof, and alphanumeric characters, and strings thereof, which are used in non-text contexts.

The various technologies described herein generally relate to capture, processing and management of handwritten content on portable and non-portable computing devices in a manner which allows conversion of that content into publishable documents. The systems and methods described herein may utilize recognition of users' natural writing or drawing styles input to a computing device via an input interface, such as a touch sensitive screen, connected to, or of, the computing device or via an input device, such as a digital pen or mouse, connected to the computing device. Whilst the various examples are described with respect to recognition of handwriting input using so-called online recognition techniques, it is understood that application is possible to other forms of input for recognition, such as offline recognition in which images rather than digital ink are recognized.

The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
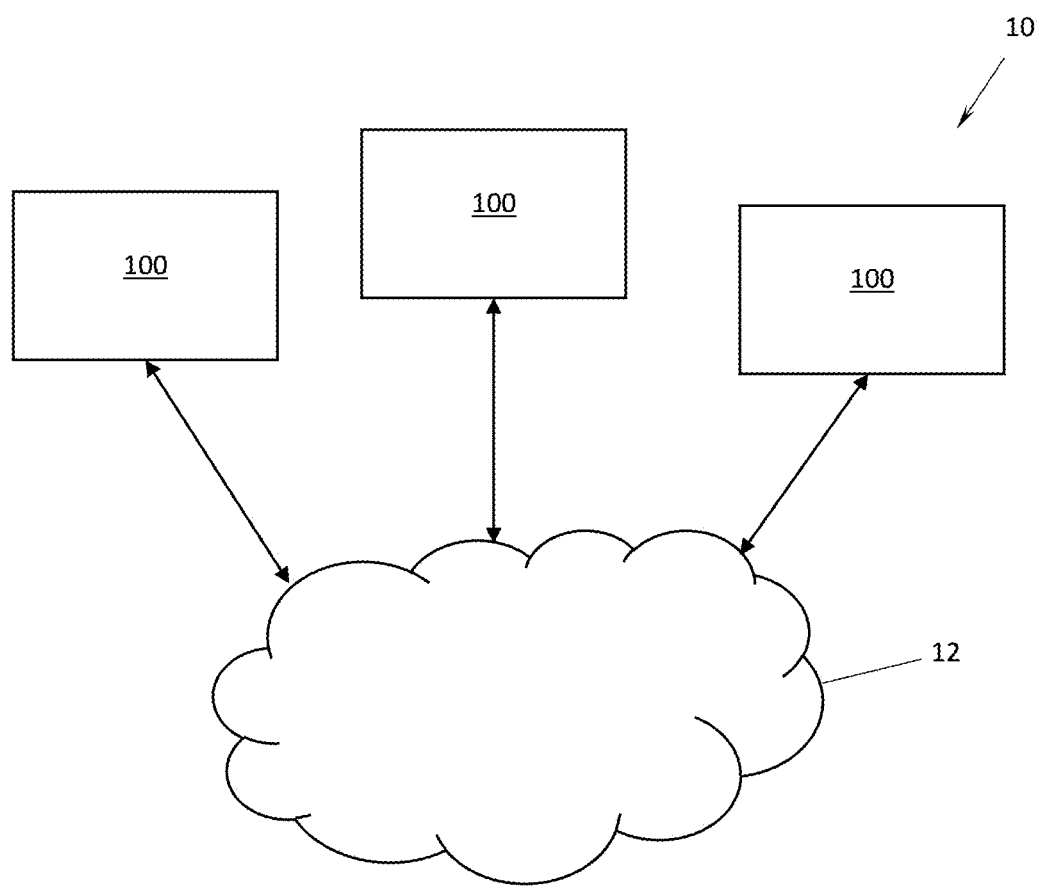
FIG. 1 shows a block diagram of a collaboration environment in accordance with an example of the present system and method.

FIG. 1 shows a block diagram of a collaboration environment 10 according to an example of the present system and method. The collaboration environment 10 includes a number of computing or input devices 100 which are communicatively interconnected with one another via a network 12. The network 12 may be for example a wired network, such as cable or fiber Ethernet (e.g., a local area network (LAN), a personal area network (PAN), a metropolitan area network (MAN)), in which the computing devices 100 are wire-connected to one another, or a wireless network, such as a radio communications network (e.g., an amplitude modification (AM) channel, a frequency modification (FM) channel), a mobile telecommunications network (e.g., 3G, 4G), short-range network (e.g., infrared, BLUETOOTH®), Wi-Fi (e.g., a wireless LAN, PAN or MAN, a wireless wide area network (WAN)), in which the computing devices 100 are wirelessly-connected to one another, or a combination of both. Further, the network 12 may be unsecured or secured, for example, with encryption. In the described examples, the network 12 is a peer-to-peer network with the devices 100 connected directly to one another. Peer-to-peer technologies allow multiple users to work on the same information without relying on one user acting as a master of the information.

Figure 2:
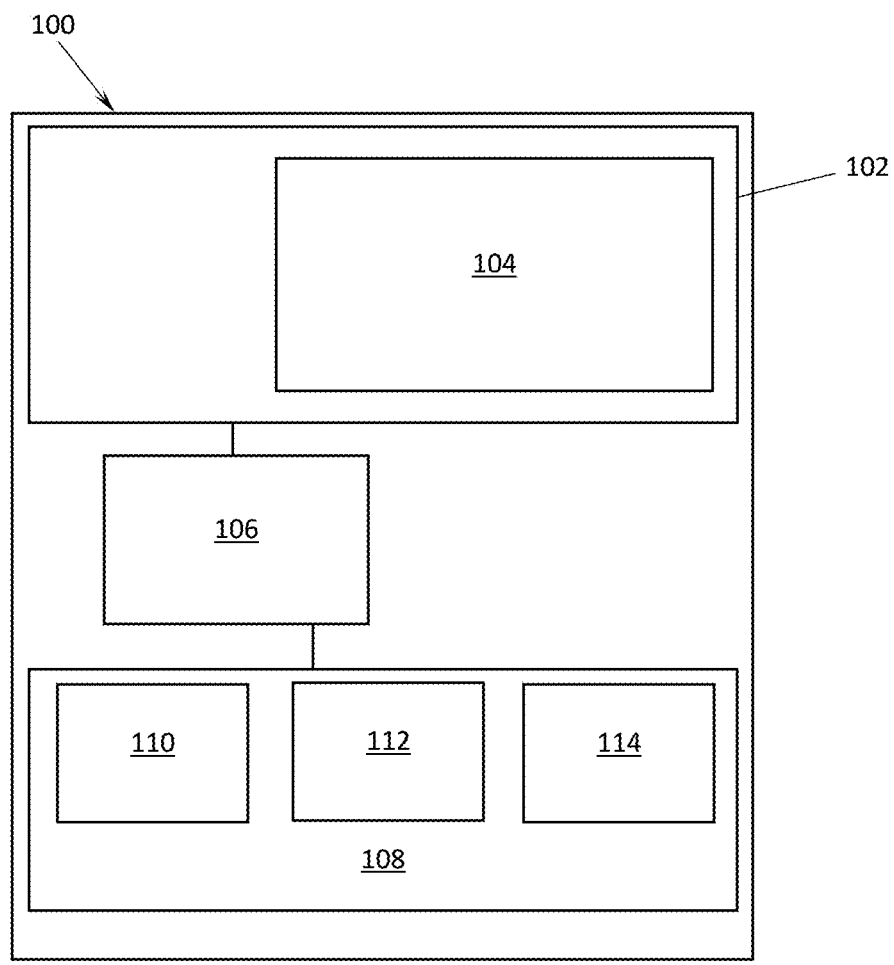
FIG. 2 shows a block diagram of a computing device in accordance with an example of the present system and method.

Each computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. FIG. 2 shows a block diagram of an example configuration of one or more of the computing devices 100. The computing device 100 includes components of at least one processing element, some form of memory and input and/or output (I/O) devices. The components communicate with each other and with the network 12 through inputs and outputs, such as connectors, lines, buses, cables, buffers, electromagnetic links, networks, modems, transducers, IR ports, antennas, or others known to those of ordinary skill in the art.

The illustrated example of each computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input interface 104. The input interface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input interface 104 may be bounded by a permanent or video-generated border that clearly identifies its boundaries. Instead of, or additional to, an on-board display, the computing device 100 may have a projected display capability.

Each computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs internal to the computing device 100 and the network 12, such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

Each computing device 100 also includes a processor 106, which is a hardware device for executing software, particularly software stored in memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and a document management system 112 in the form of a non-transitory computer readable medium having a computer readable program code embodied therein. The operating system 110 controls the execution of the document management system 112. The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the document management system 112 of the present system and method may be provided without use of an operating system.

The document management system 112 includes one or more processing elements related to detection, management and treatment of user input (discussed in detail later). The software may also include one or more other applications related to input recognition, different functions, or both. Some examples of other applications include a text editor, telephone dialer, contacts directory, instant messaging facility, computer-aided design (CAD) program, email program, word processing program, web browser, and camera. The document management system 112, and the other applications, include program(s) provided with the computing device 100 upon manufacture and may further include programs uploaded or downloaded into the computing device 100 after manufacture.

Figure 3:
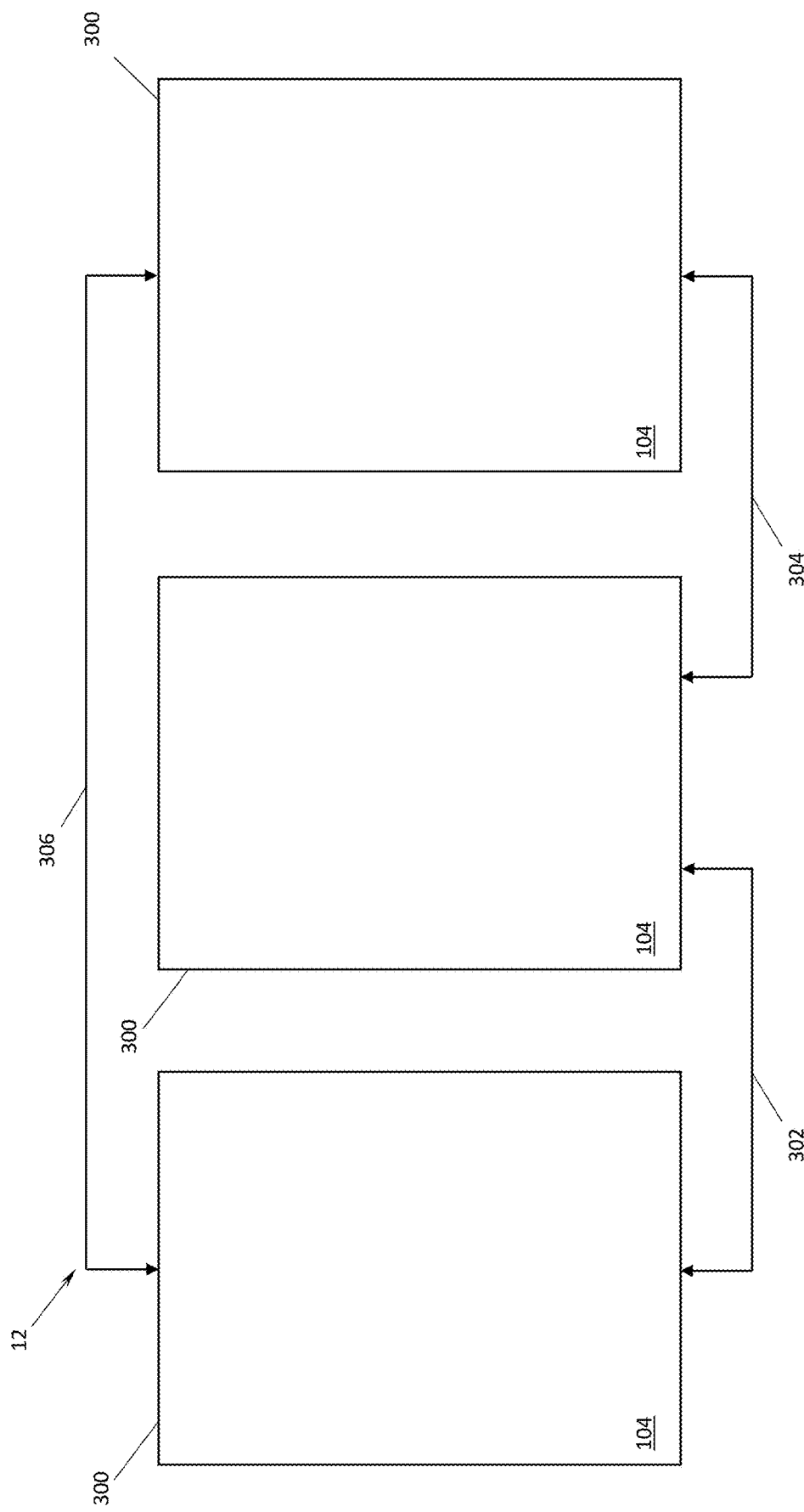
FIG. 3 shows a block diagram showing an example visual rendering of a display and user input area on at least a portion of the input interface multiple computing devices.

FIG. 3 shows a block diagram of an example visual rendering of a display and user input area 300 on at least a portion of the input interface 104 of three peer-to-peer connected computing devices 100. The input area 300 is provided as a 'canvas' that allows users to create object blocks (blocks of text, drawings, etc.). This canvas may be constraint-free, such that users can create their content anywhere without worrying about sizing or alignment, a constrained canvas in which users are guided to adhere to an alignment structure, such as a line pattern background or the like, or a combination of both particularly with respect to examples of text and non-text content input. An example alignment pattern is described in United States Patent Application Publication No. 2017/0060819 titled "System and Method of Digital Note Taking" filed claiming a priority date of 25 Aug. 2015 in the name of the present Applicant and Assignee, the entire content of which is incorporated by reference herein.

Within these display and input areas 300, the document management system 112 of each device 100 may cause display of text and/or non-text content documents, rendered from document information stored in the memory 108, for example, in a manner well understood by one of ordinary skill in the art. The document information may be loaded into, or created and/or edited using the device 100 and stored in, the memory 108 of the device 100. This loading may be effected in known manner using the I/O devices described earlier, including the communication of the document information from one of the devices 100 to one or more of the other devices 100 via the network 12. To illustrate this, FIG. 3 shows each of the display and input areas 300 as respectively being interconnected via (peer-to-peer) links 302, 304 and 306 of the network 12.

The management of this document information by the document management system 112 of the present system and method is now described with respect to FIGS. 4 to 19.

Figure 4A:
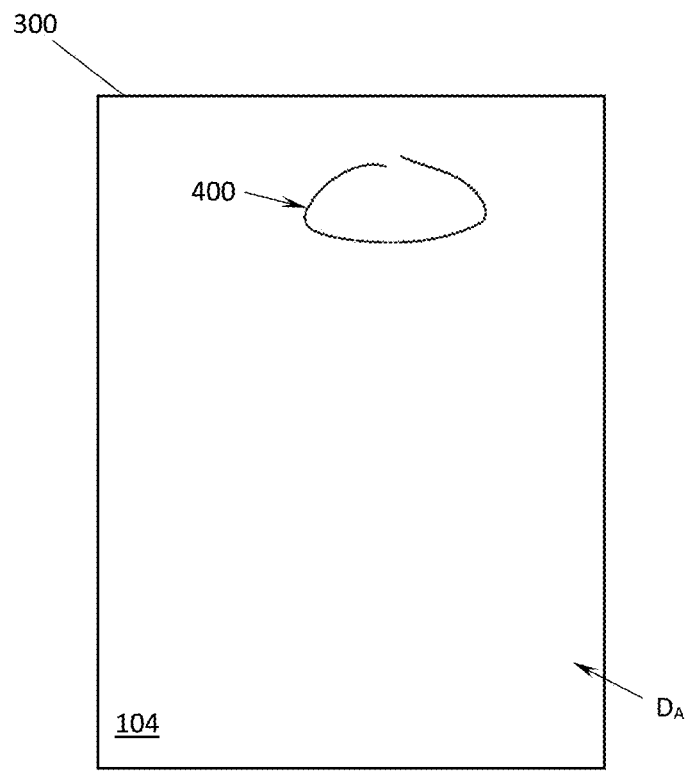
FIG. 4A shows an example document displayed on the display and input area of one of the computing devices having handwritten input rendered as digital ink thereon.

FIG. 4A shows the display and input area 300 associated with one of the computing or digital devices 100 having handwritten input which has been rendered as digital ink 400 by the document management system 112, or the processor 106 of the device 100, according to the user input in the position at which the input is made, for example.

The input of handwritten content onto the input area 300 is performed through the use of gestures in relation to the input interface 104, e.g., through touch, force and/or proximity depending on the screen technology of the device 100, or with a peripheral device of the computing device 100, such as a mouse or joystick, or with a projected interface, e.g., image processing of a passive plane surface to determine the stroke and gesture signals. Gesture detection may be handled differently depending on the ability of the computing device 100 to differentiate a user's finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 300 is to be considered as content input or content interaction. The handwritten input is interpreted by a handwriting recognition (HWR) system 114 (see FIG. 2).

The HWR system 114 may be included in the software of the memory 108. As with the document management system 112, the HWR system 114 is in form of a non-transitory computer readable medium having a computer readable program code embodied therein. The operating system 110 controls the execution of the HWR system 114. Alternatively, the HWR system 114 of the present system and method may be provided without use of an operating system.

The present system and method make use of the HWR system 114 in order to recognize handwritten input to the device 100, including handwritten text and hand-drawn shapes, e.g., non-text. The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the HWR system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programing languages for example but no limited to Hope, Rex, Common Lisp, Scheme, Clojure, Racket, Erlang, OCaml, Haskell, Prolog, and F#.

Alternatively, the HWR system 114 may be a method or system for communication with a handwriting or mixed input recognition system remote from the device, such as server or cloud-based system, but is remotely accessible by the computing device 100 via the network 12 through communications links using the afore-mentioned communications I/O devices of the computing device 100. Further, the document management system 112 and the HWR system 114 may operate together or be combined as a single application. Further still, the document management system 112 and/or the HWR system 114 may be integrated within the operating system 110.

Handwritten strokes entered on or via the input interface 104 are processed by the processor 106 as digital ink. A stroke is characterized by at least the stroke initiation location, the stroke termination location, and the path connecting the stroke initiation and termination locations. Further information such as timing, pressure, angle at a number of sample points along the path may also be captured to provide deeper detail of the strokes. Because different users may naturally write the same object, e.g., a letter, a shape, a symbol, with slight variations, the HWR system accommodates a variety of ways in which each object may be entered whilst being recognized as the correct or intended object.

FIG. 5 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized ink objects are then output 120 to the document management system 112 for further processing and/or display.

Figure 6:
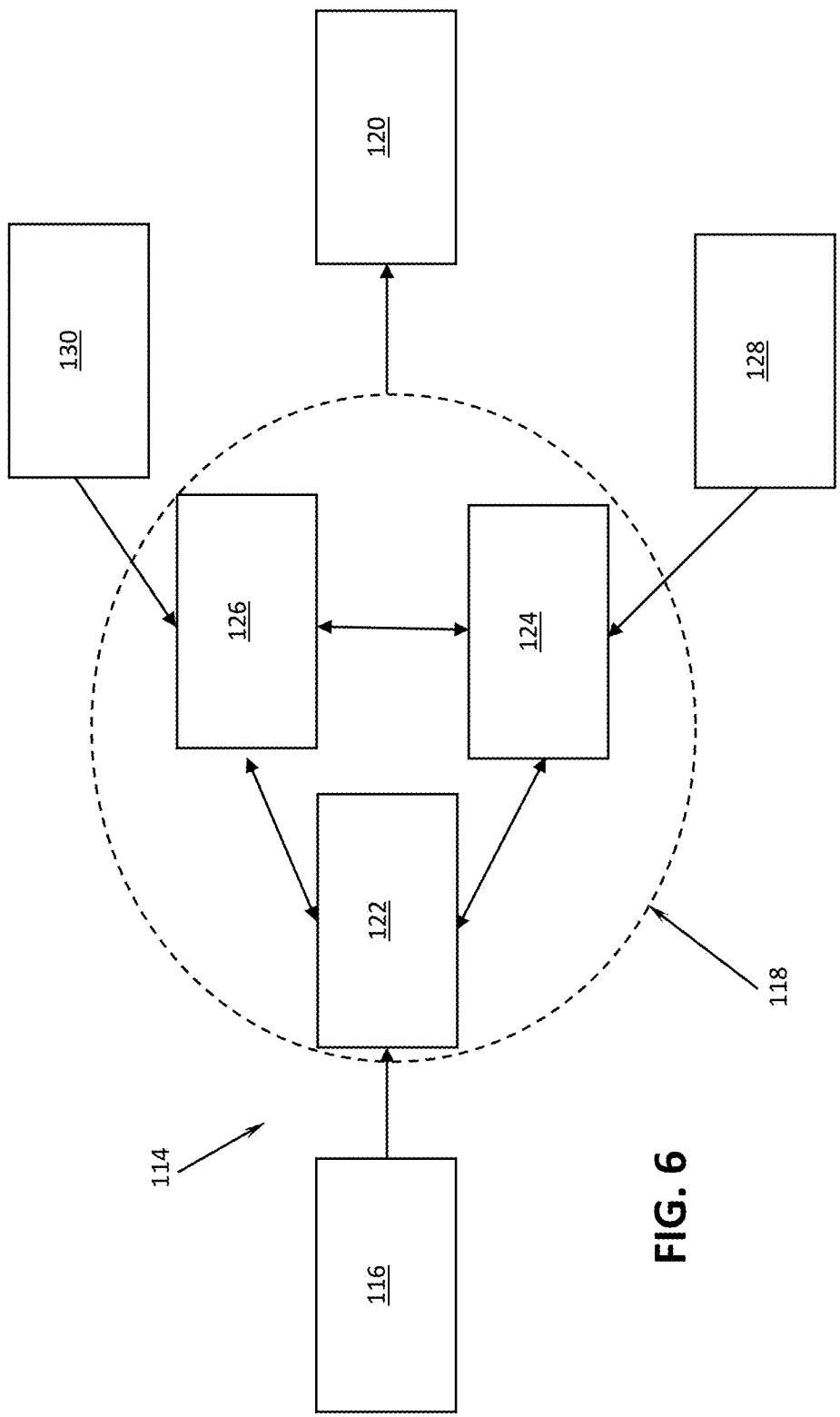
FIG. 6 shows a block diagram illustrating detail of the handwriting recognition system of FIG. 5 in accordance with an example of the present system and method.

The recognition stage 118 may include different processing elements or experts. FIG. 6 is a schematic pictorial of the example of FIG. 5 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation. Nodes of the graph are considered adjacent if the corresponding hypotheses have no common stroke but whose strokes are consecutive in the original input.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126.

The language expert 126 aims at finding the best recognition path. In one example, the language expert 126 does this by exploring a language model such as final state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

As described, the HWR system 114 interprets both text and non-text handwritten input. For example, the input 400 of FIG. 4A is handwriting input of a single stroke representing non-text input that is a shape, i.e., an oval (or circle). Accordingly, the HWR system 114 recognizes the input 400 as an oval, for example. Conventional handwriting recognition processes use such recognition in order to provide typesetted on fontified conversion of handwriting input. As this is the main purpose of such conventional processes, such conversion is typically all that is provided by the processing. The document management system 112 of the present system and method however may further employ the recognition performed by the HWR system 114 in order to provide a document collaboration model. Alternatively, or additionally, the document management system 112 itself may be configured with at least elements of the HWR system 114 in order to recognize at least certain content input in order to provide this collaboration model.

The collaboration model provided by the present system and method allows the creation and editing of digital documents by multiple users on multiple peer-to-peer connected input devices (with one or more users per device) using handwriting (and other forms of input, such as typing using a physical or virtual keyboard, gestures using a mouse, speaking using voice recognition, etc.) as they could be created for example on an interactive whiteboard.

In order provide this collaborative function, pieces of a document are shared between the users or collaborators in a manner which maintains control over the integrity of the document, particularly over the recognition of the raw ink and rendering of the digital ink. As described in the background, conventionally proposed systems typically maintain this control using master-slave or client server arrangements. On the other hand, the present system and method provides a truly collaborative experience through provision of the peer-to-peer network arrangement. It will be understood from the following description however that the present system and method may also be applicable to centralized or client server based applications.

The document pieces or segments are shared in the present system and method through a so-called "blockchain" implementation adapted for handwritten content and handwritten control data. This adaptation decomposes user handwritten interactions in a manner which provides maximum user experience in collaboration. The blockchain is formed as a chain of blocks or 'messages'. These messages are accurate with respect to the captured handwriting to provide the required data integrity whilst being as simple as possible so that the information can be shared quickly. The collaboration model is built during document creation and editing to allow maximum flexibility and robustness.

The messages are defined in relation to the recognition results and applied by the document management system 112 as documents are worked on (e.g., in real-time) by one or more users on one or more devices so that each action of the one or more users which provides the document with 'raw' ink, e.g., handwritten input, is expressed in a sharable manner and is linkable with all modifications made to the document by that user in the previous state(s) of the document. The messages and links are used to build, and are retained in, one or more 'journals' associated with the document. These journals represent blockchains with the messages linked in time-order of the input associated with the messages.

In particular, each user or version of the document, i.e., as locally stored and displayed on each device, has an associated document journal, which can be used to build further versions of the document, e.g., on another device, as the information stored in the or each journal can be shared with every other user/device or actor of the collaboration. In this way, each actor is capable of detecting that a modification was made on a different state of the document so that the latest version of the document can always be displayed, subsequent modifications can be applied to the correct document version, and any modification provided through any input means can be undone and redone.

Example content of the messages and the manner of the actors' behavior when it is detected that their modifications are at a position in the journal different to the last position shared by and with the other actor(s) are now described in detail.

All actors manipulating a document build their own version of a document journal using the document management system 112 of the device 100 being used to act. This journal is built of a series of interlinked messages or blocks. The messages are created by the document management system 112 for each (pre-defined) modification that is made to the document, such that the document itself may be defined as a series of modifications, with each (pre-defined) modification stored as a journal entry. Pre-definition of certain modifications for inclusion in the journal may be provided to the document management system 112 (e.g., through pre-programming or user setting, such as through a user interface (UI)). Each message is defined with identification (ID) information and information on the modification(s) to the document being made. In this way, a journal or tree of modifications by different actors can be built with relatively very little information needed for faithful construction or re-construction of the current version of a document on several devices.

The ID information at least identifies that message (message ID) and any link to an earlier message(s) of the chain (parent ID). The message ID, and therefore the parent ID also, may define the identification of a user of the device or author of the message. For example, such IDs may be determined by the document management system 112 from suitable user identification information provided by the operating system 110 or applications of the device 100. Defining the IDs in this way allows tracking of document modifications by different members of a collaborative team, for example.

The modification information is at least on the type of the modification (type) and the content of the modification (data). The modification information may also include identification information that identifies the modifications' author(s), which may be different than the user or author IDs of the messages themselves. For example, a user may make a document modification on a device that is not registered or otherwise defined for that user. In such a case, the document management system 112 may determine the modification author's ID from applications of the device 100 or a suitably configured (active) stylus being used by the user, for example.

Modification types are related to the type of action being performed on the document and its ink content, including the addition of new content and the editing of existing content. For example, the type of modification, or type of message, includes modifications to one or more strokes of handwritten content, such as addition of handwritten stroke(s) (stroke), typesetting of handwritten stroke(s) (typeset), erasure of one or more strokes (erase), movement of one or more strokes (move), resizing of one or more strokes (resize), styling of one or more strokes (styling).

The modification type may also include input of commands by gesture, menu selection and the like, such as selection of one or more strokes (select), undoing of the previous input (undo), redoing of the previous input (redo), showing of extra content (show), e.g., hyperlinks, menus, recognition candidates or results. The reverse operation of some of these modifications may also included in the modification type, such as un-typesetting of previously typeset stroke(s) (untypeset), de-selecting stroke(s) (deselect), hiding shown extra content (hide). These modification types are examples and are non-exhaustive, such that it is understood that less, other or more types can be provided in the document journal messages.

The modification data is related to the content of the modification type and is provided with a data format that depends on the related type. Examples of several modification data formats are now described with respect to example document journals built by the document management system 112.

For the 'stroke' modification type, the modification data is the handwritten content input by the user to the input interface 104 (or uploaded/downloaded to the document management system 112). In the present example, this content is the raw ink, including the coordinates of the raw ink (e.g., the relative positions of the handwritten stoke(s) on the input interface 104), and the recognition result of the raw ink (from the HWR system 114, or the document management system 112 if so configured, e.g., the recognition candidates). Accordingly, each actor receiving journal messages from other actors receives the strokes of the raw ink and the recognition results therefor in the modification data. As such, the document management system 112 of the receiving actor(s) is able to render the corresponding digital ink in their version of the shared document and interaction with the rendered digital ink is substantially immediately possible without requiring re-recognition.

That is, when the recognition results are shared as part of the messages, each device 100 may merely render the digital ink according to the latest version of the document (described in detail later) and refer to the shared modification data for any subsequent interactions with the document content or objects without requiring full re-recognition of the content, including superseded content of previous versions of the document.

Alternatively, the 'stroke' modification data portion may include ink object(s) created from the coordinates of the raw ink, the recognition result of the raw ink, and the digital ink definition rendered from the raw ink. The ink objects may be defined as described in U.S. patent application Ser. No. 15/083,195 titled "System and Method for Digital Ink Interactivity" filed claiming a priority date of 7 Jan. 2016 in the name of the present Applicant and Assignee, the entire content of which is incorporated by reference herein. In such an alternative example the actual strokes of the raw ink are not shared between the collaborating devices and the digital ink is rendered from the shared digital ink definition. Accordingly, each device is able to discard the raw ink once recognition has been performed. This decreases the local ink storage size and amount of data being communicated.

Alternatively further, the document management system 112 of each device may be configured to communicate received raw ink one-time to a central location, e.g., a networked ink memory or cache, with identifiers such as the message ID related to that raw ink, and then discard any local storage of the raw ink. In such an alternative example the 'stroke' modification data portion does not include the raw ink or digital ink definition, such that upon receiving messages each actor accesses the raw ink from the ink memory or database and generates the digital ink locally.

Alternatively, or additionally, still, the 'stroke' modification data portion may include only the relative stroke coordinates, e.g., the x and y positions of the stroke path, which represent the raw ink. In such an alternative example the document management system 112 and/or HWR system 114 of each device 100 is required to recognition process the data portion of each message of a document journal when the messages are shared.

The described modification data are examples and are non-exhaustive, such that it is understood that other or more data types (formats) can be provided in the document journal messages. In any case, the 'stroke' data of the modification data may act as data to identify the strokes, e.g., one or more stroke IDs. That is each stroke may be assigned a stroke ID, such that a set of strokes can be represented as a set of the corresponding stroke IDs, where this set may be assigned a (group) stroke ID, in turn for example. In this way, subsequent reference to the stroke data via the stroke ID(s) can be performed to provide interaction and editing of the strokes and groups of strokes, which together represent ink content, such as text and non-text content.

Figure 4B:
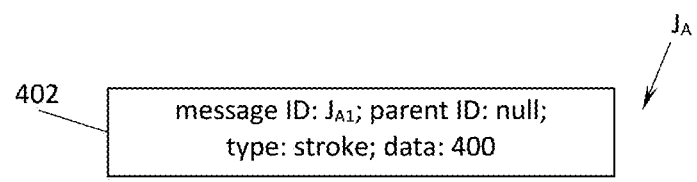
FIG. 4B shows a document journal associated with the document of FIG. 4A in accordance with an example of the present system and method.

For the illustrated example of FIG. 4A, upon detecting the input 400 the document management system 112 initiates building a document $D_A$ with an associated document journal $J_A$, as shown in FIG. 4B. As shown, the journal $J_A$ has a message 402, which is the first or initial (root) message of the journal (as the single stroke of the input 400 is the first input provided for the document $D_A$). As described above, the message 402 is generated by the ink management system 112 to contain a message ID portion A1, a parent ID portion "null" (since the message 402 is the primary message of the journal $J_A$), a type portion "stroke" (since the input 400 adds handwritten strokes to the document $D_A$ without modification of any existing content), and a data portion "400" being the raw and recognized content represented by the digital ink 400, e.g., the stroke ID.

The form of the message ID may be in any suitable format, such as (alpha)numeric, binary, hexadecimal, where such forms may or may not be encrypted, such as using a hash function (such as SHA-256, for example). The message IDs may be assigned incrementally to avoid collisions from different actors or each actor may generate an ID and then make it unique such as by hashing the generated ID using a hash function (e.g., SHA-256), so that the same message IDs are used across all document version journals, which is the case in the illustrated examples. Alternatively, the message IDs may be generated to be local to the journal versions. In such a case however the document management system includes a mapping algorithm or the like to match the different message IDs to the same message content for the shared journal.

The message and parent IDs are also formed to include time information, e.g., a time-stamp, which records the time (and date) when the modification of the message was performed. This time information may be determined by the document management system 112 with reference to the system clock of the hosting device, for example, or by other means understood by one of ordinary skill in the art. The time information may be included, for example, through inclusion in the code of the ID itself. In this determination however, the relative timing of modifications to a shared document made on different devices, whether connected or not at the time of the modification(s) needs to be known or ascertainable by the document management system 112 of each device, for reasons discussed later.

FIGS. 7 to 9 show subsequent handwritten input to the document $D_A$ and the consequential building and updating of the journal $J_A$. In these example operations, and those of FIGS. 10-19 thereafter the manner of input detection, digital ink rendering and recognition is as described earlier.

Figure 7A:
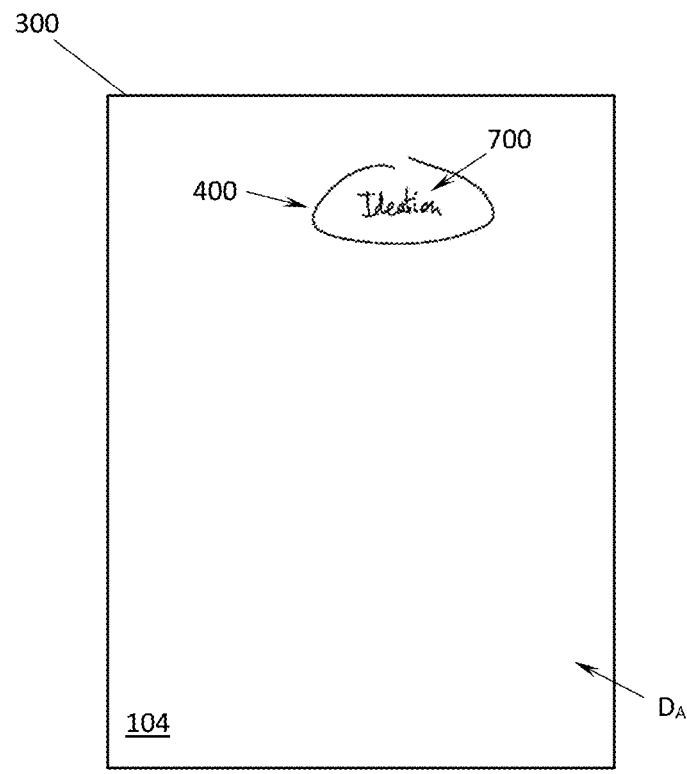
FIG. 7A shows the example document of FIG. 4A having further handwritten input rendered as digital ink thereon.
Figure 7B:
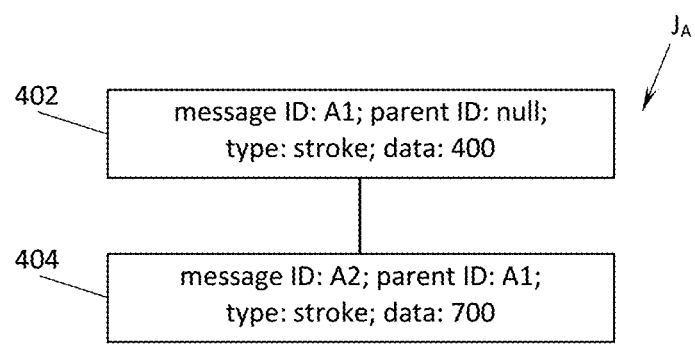
FIG. 7B shows a document journal associated with the document of FIG. 7A in accordance with an example of the present system and method.

FIG. 7A shows the document $D_A$ upon subsequent input which has been rendered as digital ink 700. The input 700 is handwriting input of multiple strokes representing text input which is recognized as the capitalized word "Ideation". Based on this modification of the document $D_A$, the document management system 112 updates the document journal $J_A$ as shown in FIG. 7B to include a corresponding message 404, which is the second (subsequent) message of the journal. The message 404 is generated to contain a message ID portion A2, a parent ID portion A (since the message 402 is the second message of the journal $J_A$), a type portion "stroke", and a data portion "700" being the raw and recognized content represented by the digital ink 700.

Figure 8A:
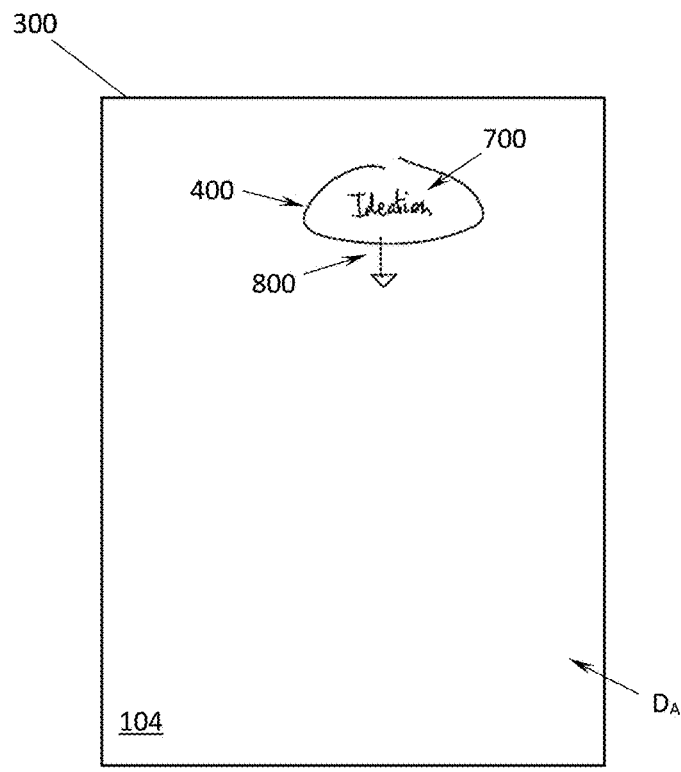
FIG. 8A shows the example document of FIG. 7A having further handwritten input rendered as digital ink thereon.
Figure 8B:
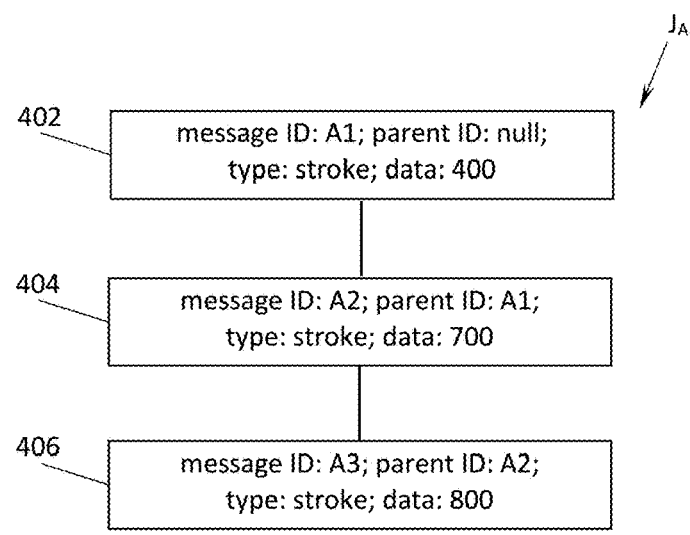
FIG. 8B shows a document journal associated with the document of FIG. 8A in accordance with an example of the present system and method.

FIG. 8A shows the document $D_A$ upon subsequent input which has been rendered as digital ink 800. The input 800 is handwriting input of multiple (e.g., two) strokes representing non-text input which is recognized as a shape, being an arrow. Based on this modification of the document $D_A$, the document management system 112 updates the document journal $J_A$ as shown in FIG. 8B to include a corresponding message 406, which is the third (subsequent) message of the journal. The message 406 is generated to contain a message ID portion A3, a parent ID portion A2, a type portion "stroke", and a data portion "800" being the raw and recognized content represented by the digital ink 800.

Figure 9A:
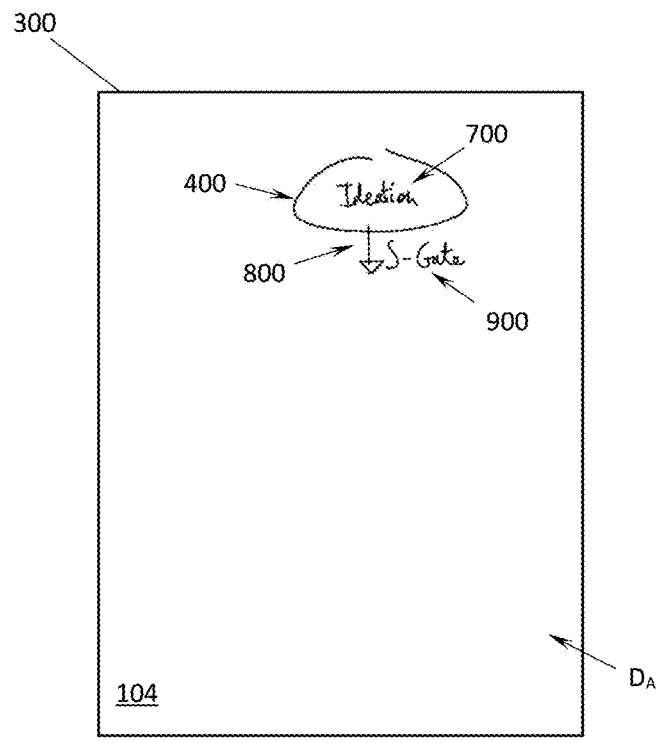
FIG. 9A shows the example document of FIG. 8A having further handwritten input rendered as digital ink thereon.
Figure 9B:
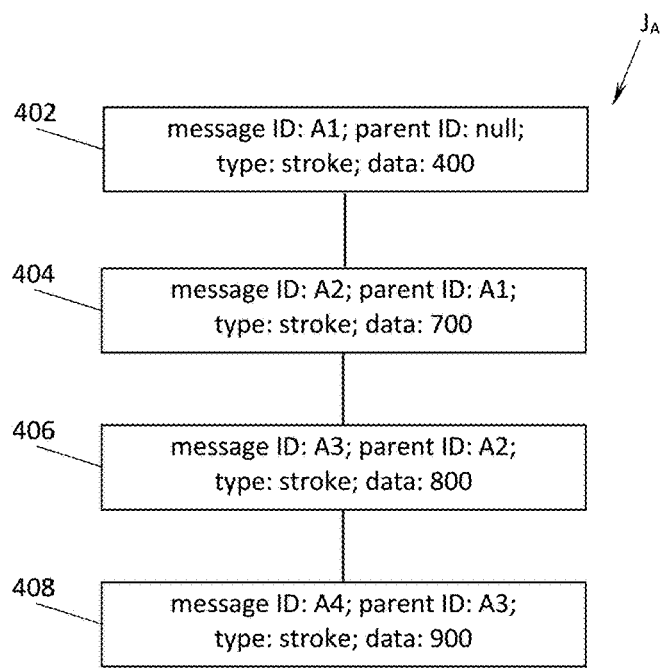
FIG. 9B shows a document journal associated with the document of FIG. 9A in accordance with an example of the present system and method.

FIG. 9A shows the document $D_A$ upon subsequent input which has been rendered as digital ink 900. The input 900 is handwriting input of multiple strokes representing text input which is recognized as the capitalized term "S-Gate". Based on this modification of the document $D_A$, the document management system 112 updates the document journal $J_A$ as shown in FIG. 9B to include a corresponding message 408, which is the fourth (subsequent) message of the journal. The message 408 is generated to contain a message ID portion A4, a parent ID portion A3, a type portion "stroke", and a data portion "900" being the raw and recognized content represented by the digital ink 900.

The inputs 400, 700, 800, 900 represent elements of a diagram. Diagrams are drawings that explain or show arrangement and relations (as of parts). Diagrams generally include shapes having arbitrary or specific meanings and text with relationships to these shapes. There are many type of diagrams, such as flowcharts, organizational charts, concept maps, spider maps, block/architecture diagrams, mindmaps, block diagrams, Venn diagrams and pyramids. This list is not exhaustive and other types, or non-types, of diagrams are possible.

With respect to diagrams, non-text elements define shape, graphic or geometric formations in linear or non-linear configurations, and include containers, connectors and freeform drawings, whereas text elements are those that contain text characters and include text blocks and labels for the text blocks and non-text elements. Both text blocks and labels may contain text of one or more characters, words, sentences or paragraphs provided in one or more vertical lines and/or as numbered/bulleted lists. Text blocks may be contained by containers (internal text blocks) or may be provided outside of containers (external text blocks). External text blocks may be unrelated to containers or other elements of a diagram or may be directly related to certain other diagram elements.

In order to detect and interpret the creation of diagrams, the document management system 112 and/or the HWR system 114 may be configured as described in U.S. patent application Ser. No. 14/955,155 titled "System and Method of Handwriting Recognition in Diagrams" filed claiming a priority date of 19 Oct. 2015 in the name of the present Applicant and Assignee, the entire content of which is incorporated by reference herein. By this configuration, the present system and method may individually recognize different text and non-text elements of hand-drawn diagrams together with any spatial and context relationships therebetween without regard to the diagram type in order to interpret the various diagram elements input and their relationships with one another.

In the illustrated example therefore, the recognized oval of the input 400 is detected as a container, the recognized word of the input 700 is detected as content of the container 400, the recognized arrow of the input 800 is detected as a connector associated with the container 400, and the recognized term of the input 900 is detected as a label of the connector 800. Through this interpretation of text and non-text input the document management system 112 is able to build and update the document journals in a manner which respects diagrammatic relationships (described in detail below). Similar results can be achieved with other document content forms, such as mathematics, chemistry, music notation, etc.

As can be seen from the example document journal that has so far been described, each input modifying the content of the document is represented in the journal time-ordered chain or list of input steps. As such, the journal can be used in order to build or re-build the document on other devices so that not only is the latest version of the document displayed but all earlier versions of the document can be known and accessed via the journal. That is, as described earlier, the journal can be shared via the network 12 with the other devices 100. Upon receiving the journal, the document management system 112 local to such other devices 100 renders the digital ink represented by the messages of the journal so that the document is reproduced on those devices 100.

Figure 10A:
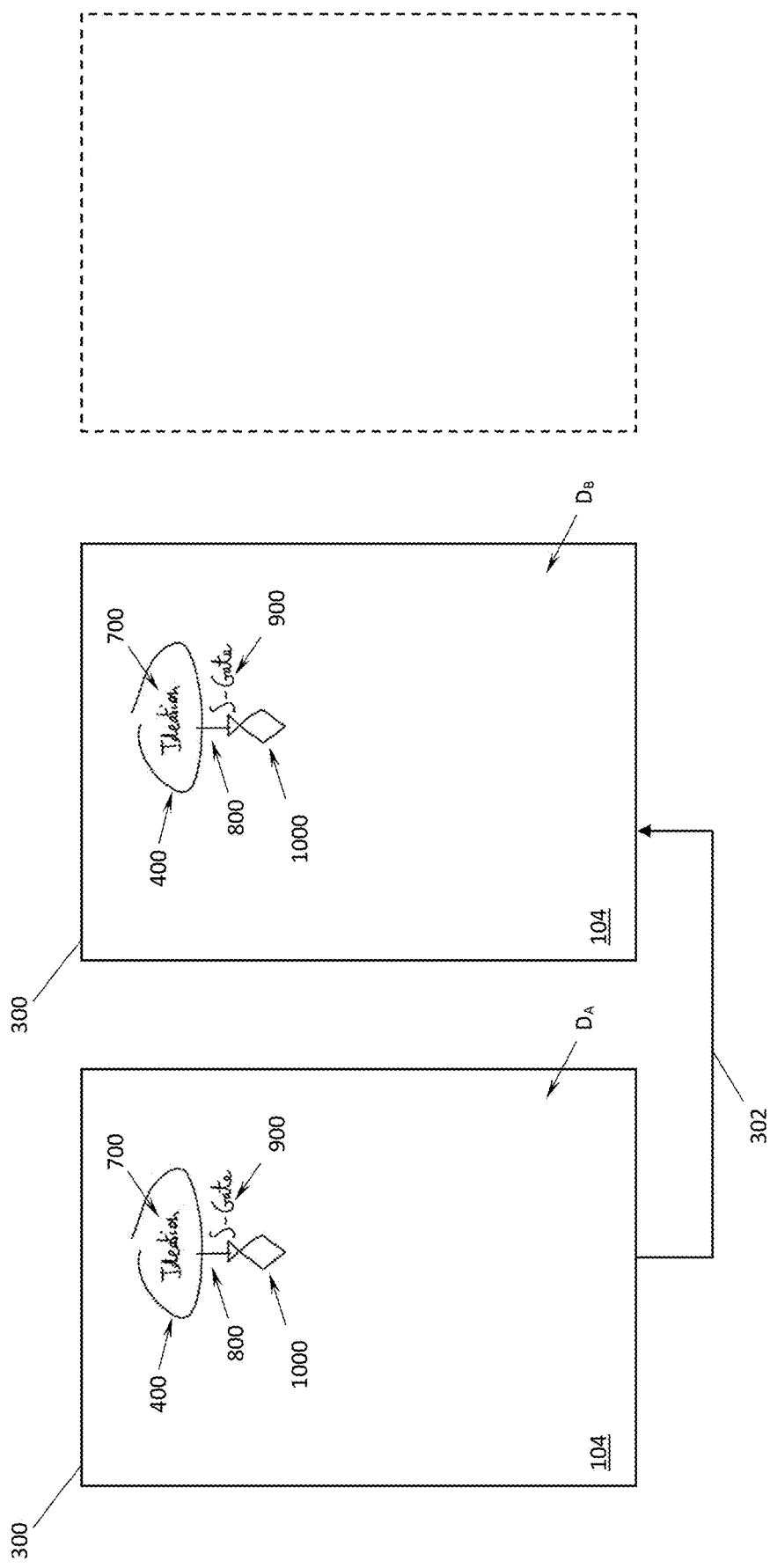
FIG. 10A shows the example document of FIG. 9A having further handwritten input rendered as digital ink thereon and an example document displayed on the display and input area of another of the computing devices having the digital ink rendered thereon.
Figure 10B:
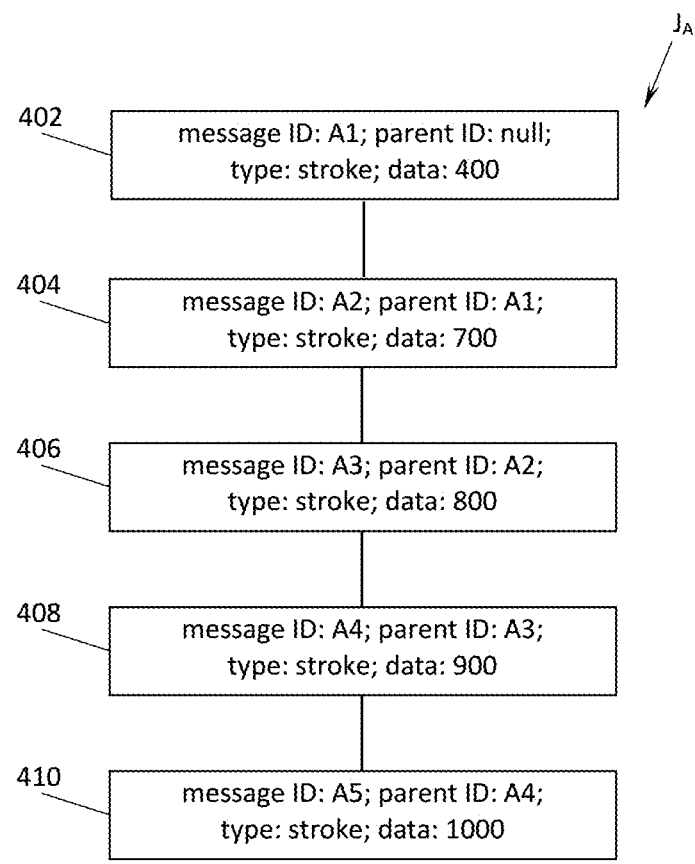
FIGS. 10B and 10C respectively show document journals associated with the documents of FIG. 10A in accordance with an example of the present system and method.
Figure 10C:
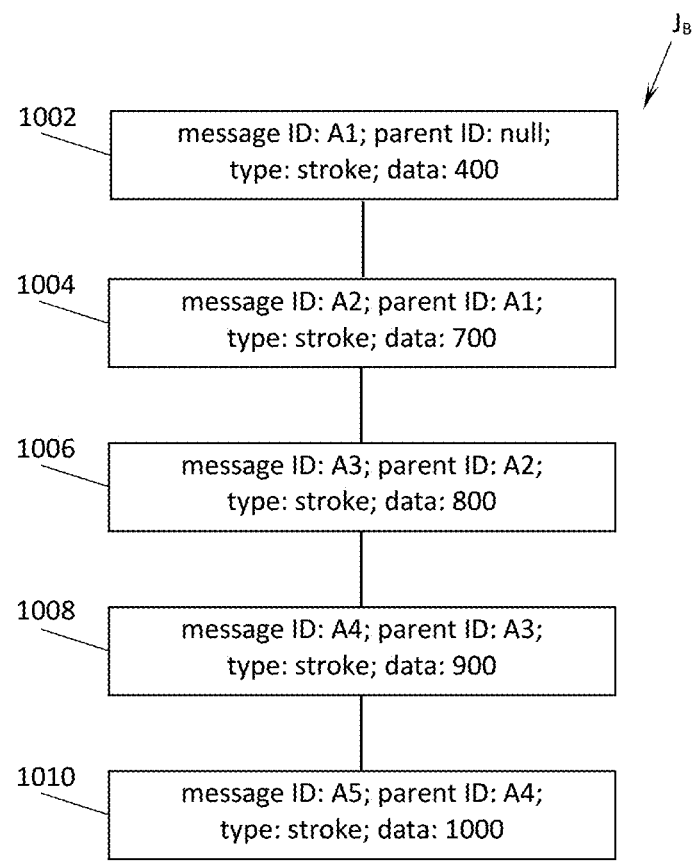

For example, FIG. 10A shows the document $D_A$ at the (first) device 100 of FIGS. 4, 7, 8 and 9, which has been communicated to a (second) device 100 via the link 302 of the network 12. For example, the user of the second device 100 may have launched a document editing application on the device 100 and opened the document from a file directory or the like to which the device is connected via the network 12. The file directory may be stored in the memory 108 of one or more of the other connected devices 100 or in a centralized location, such as a server, connected to the network 12. In response, the document management system 112 of this second device reads the journal $J_A$ of the shared document $D_A$ to construct its own document journal $J_B$ to build a document $D_B$, as shown in FIG. 10C. That is, the journal $J_B$ is generated to include a chain of messages 1002, 1004, 1006 and 1008 with associated message and parent IDs and type and content information corresponding to the respective messages 402, 404, 406 and 408 of the shared journal $J_A$. It is noted the FIG. 10A also depicts a third document shown in the dashed outline, which will be described later.

In order to determine the current status of a shared document, e.g., it is open and being worked on by multiple actors, it has been modified since last opened by the user, etc., the document management system 112 associated with each device 100 may also determine identification information of the document, such as reading a document ID from the file directory, and use this information when communicating the local document journal to the connected device and/or file directory. However, other mechanisms for maintaining a current status of a shared document are possible.

The documents $D_A$ and $D_B$, and their respective journals $J_A$ and $J_B$, represent local device/actor versions of a shared document. The present system and method ensures that at the shortest time possible after modifications are made to any local version of the document, those modifications are reflected in the other local document versions in a manner which retains the integrity of the ink data of the shared document. In this way, all actors are assured that the latest version of the shared document is available for editing, and that previous versions can be accessed for version control.

Accordingly, from the journal $J_B$, the document $D_B$ is displayed on the display and input area 300 associated with the second device 100 to include the rendered digital ink 400, 700, 800 and 900 (as shown in FIG. 10A) included in the message content journal $J_B$ based on the type portions of "stroke" and the stroke ID(s) of the associated data portions, as provided by the message content of the shared journal $J_A$. That is, the document management system 112 associated with the second device 100 reads each message of the constructed journal $J_B$ in turn to build the document $D_B$. In the present example, each message of the journal $J_B$ at this point has a modification type portion of "stroke", such that the document management system 112 reads respective modification data portions of each message to cause incremental or simultaneous display of digital ink corresponding to the stroke data.

This 'batch' loading of document ink data from a shared journal described above represents off-line collaboration in which document modifications that are carried out on one actor's version of the document are later utilized by another actor to build their version of the document. The present system and method also provides on-line or real-time collaboration in which modifications to one actor's version of a document are substantially immediately shared with the networked actor(s) to update that actor's document version.

For example, returning to FIG. 10A, the document $D_A$ has subsequent input which has been rendered as digital ink 1000. The input 1000 is handwriting input of a single stroke representing non-text input which is recognized as a shape, being a diamond, and may also be detected as a container associated with the connector 800. Based on this modification of the document $D_A$, the document management system 112 updates the document journal $J_A$ as shown in FIG. 10B to include a corresponding message 410, which is the fifth (subsequent) message of the journal. The message 410 is generated to contain a message ID portion A5, a parent ID portion A4, a type portion "stroke", and a data portion "1000" being the raw and recognized content represented by the digital ink 1000.

As the document $D_B$ is open for editing or display by the other actor and the devices 100 are connected by the link 302 of the network 12, this update of the journal $J_A$ is communicated to the other actor. As a result, the document management system 112 of the other device updates the document journal $J_B$ to include the data of the shared message 410 as a corresponding new subsequent message 1010 with the associated message and parent IDs and type and content information (as shown in FIG. 10C). From the journal $J_B$, the version of the document $D_B$ is updated and displayed on the display and input area 300 associated with the second device to include the rendered digital ink 1000 (as shown in FIG. 10A) included in the message content journal $J_B$ based on the type portion of "stroke" and the stroke ID(s) of the associated data portion, as provided by the message content of the shared journal $J_A$. Accordingly, the collaborated document is faithfully reproduced on all collaborator devices.

Figure 11A:
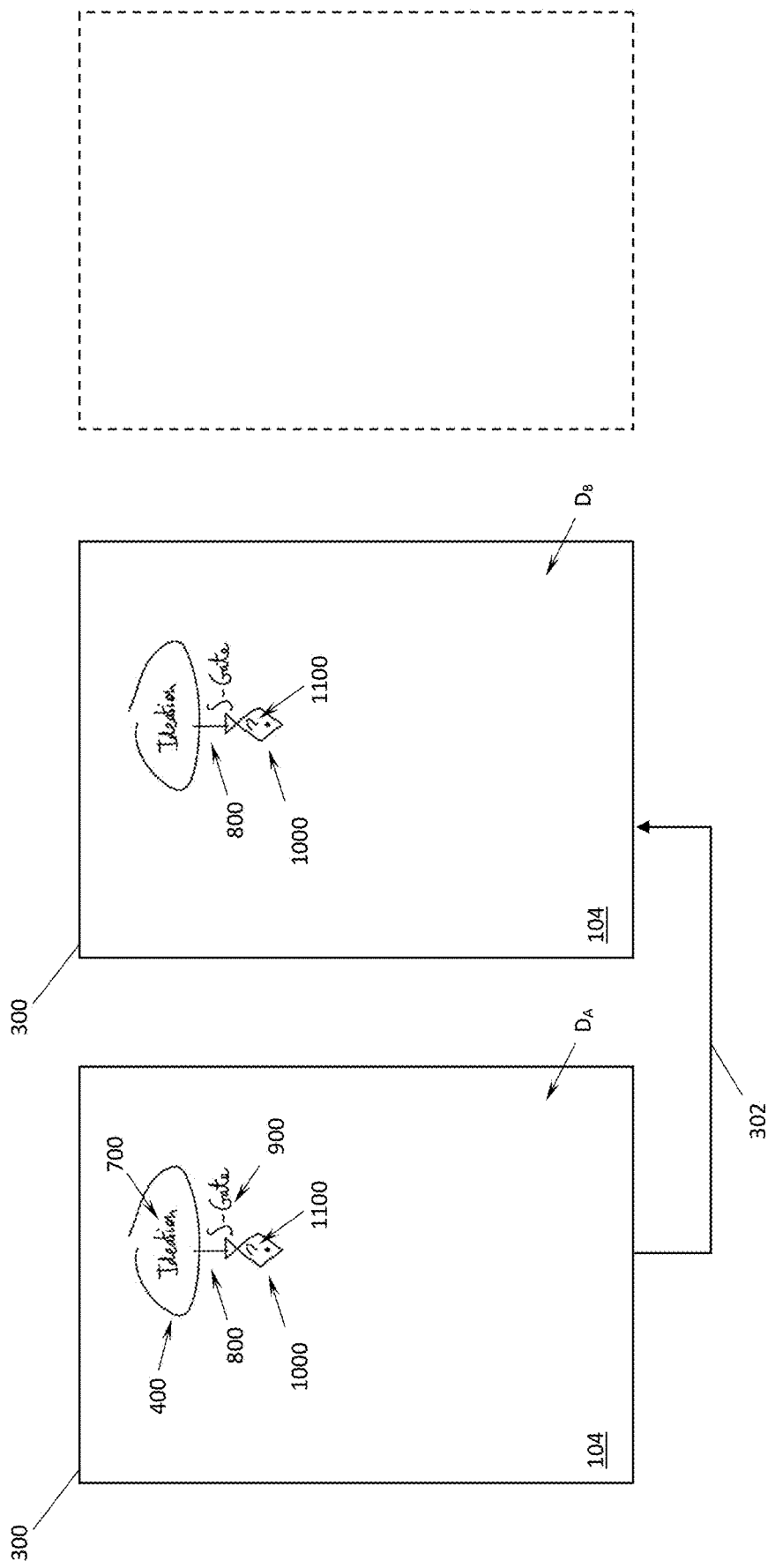
FIG. 11A shows the example documents of FIG. 10A having further handwritten input rendered as digital ink thereon.
Figure 11B:
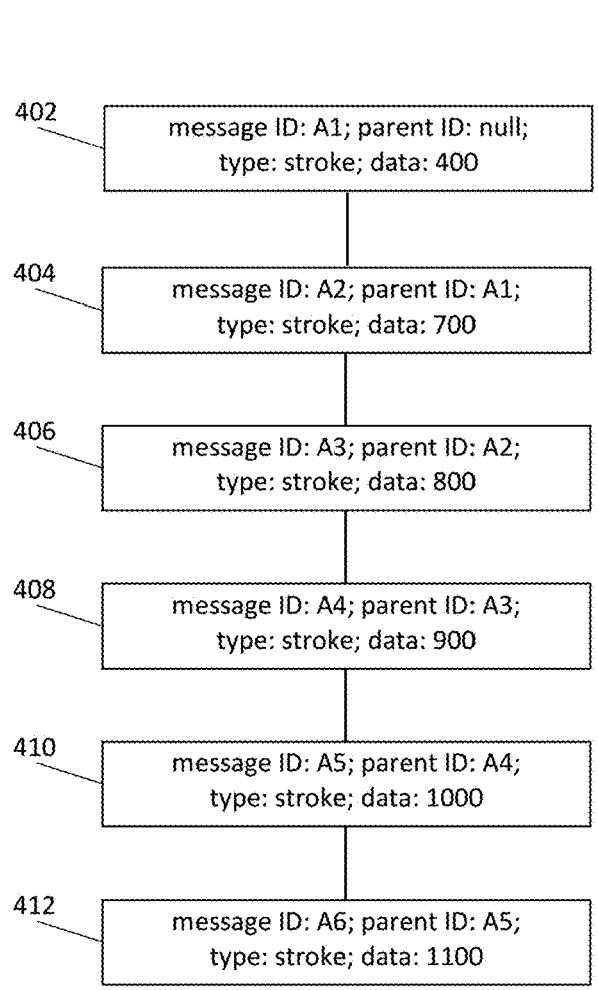
FIGS. 11B and 11C respectively show at least a portion of document journals associated with the documents of FIG. 11A in accordance with an example of the present system and method.

A similar result is gained as well for further text input, as shown in the example of FIG. 11. That is, in FIG. 11A, the document $D_A$ has subsequent input which has been rendered as digital ink 1100. The input 1100 is handwriting input of multiple strokes representing text input which is recognized as a symbol or punctuation mark, being a question mark, and may also be detected as content of the container 1000. Based on this modification of the document $D_A$, the document management system 112 updates the document journal $J_A$ as shown in FIG. 11B to include a corresponding message 412, which is the sixth (subsequent) message of the journal. The message 412 is generated to contain a message ID portion A6, a parent ID portion A5, a type portion "stroke", and a data portion "1100" being the raw and recognized content represented by the digital ink 1100.

Figure 11C:
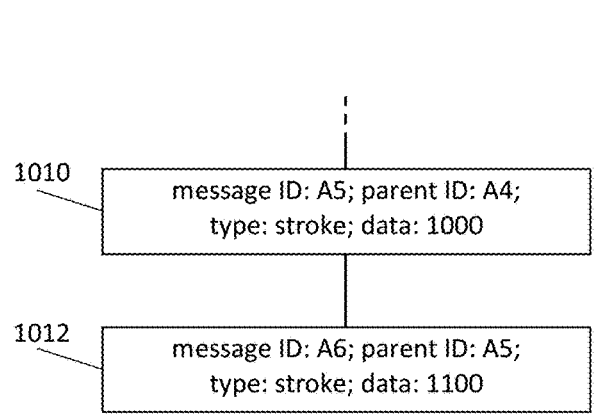

As the document $D_B$ is open for editing or display by the other actor and the devices 100 are connected by the link 302 of the network 12, this update of the journal $J_A$ is communicated to the other actor. As a result, the document management system 112 of the other device updates the document journal $J_B$ to include the data of the shared message 412 as a corresponding new subsequent message 1012 with the associated message and parent IDs and type and content information (as shown in FIG. 11C). From the journal $J_B$, the version of the document $D_B$ is updated and displayed on the display and input area 300 associated with the second device to include the rendered digital ink 1100 (as shown in FIG. 11A) included in the message content journal $J_B$ based on the type portion of "stroke" and the stroke ID(s) of the associated data portion, as provided by the message content of the shared journal $J_A$.

Figure 12A:
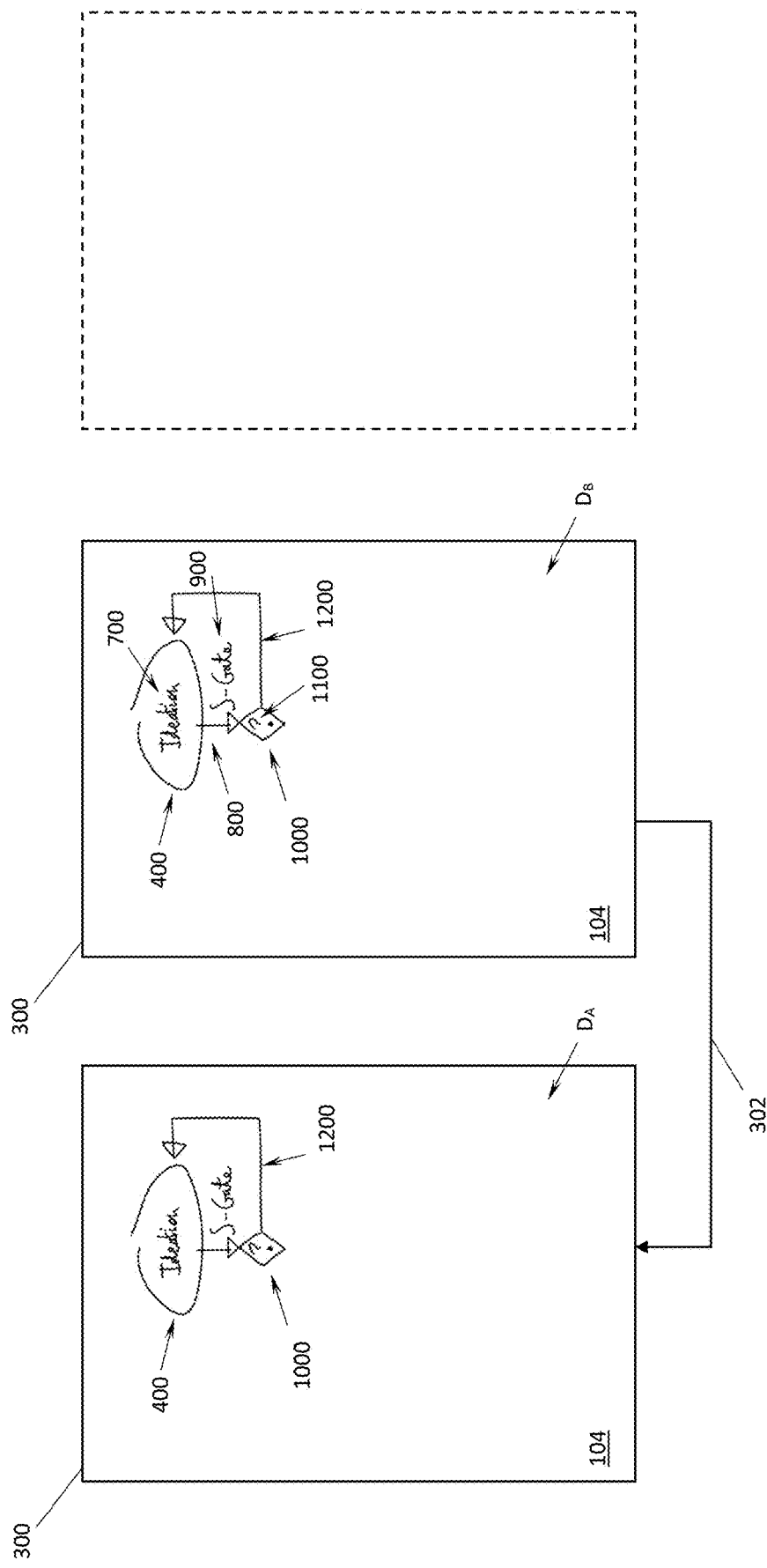
FIG. 12A shows the example documents of FIG. 11A having further handwritten input rendered as digital ink thereon.
Figure 12B:
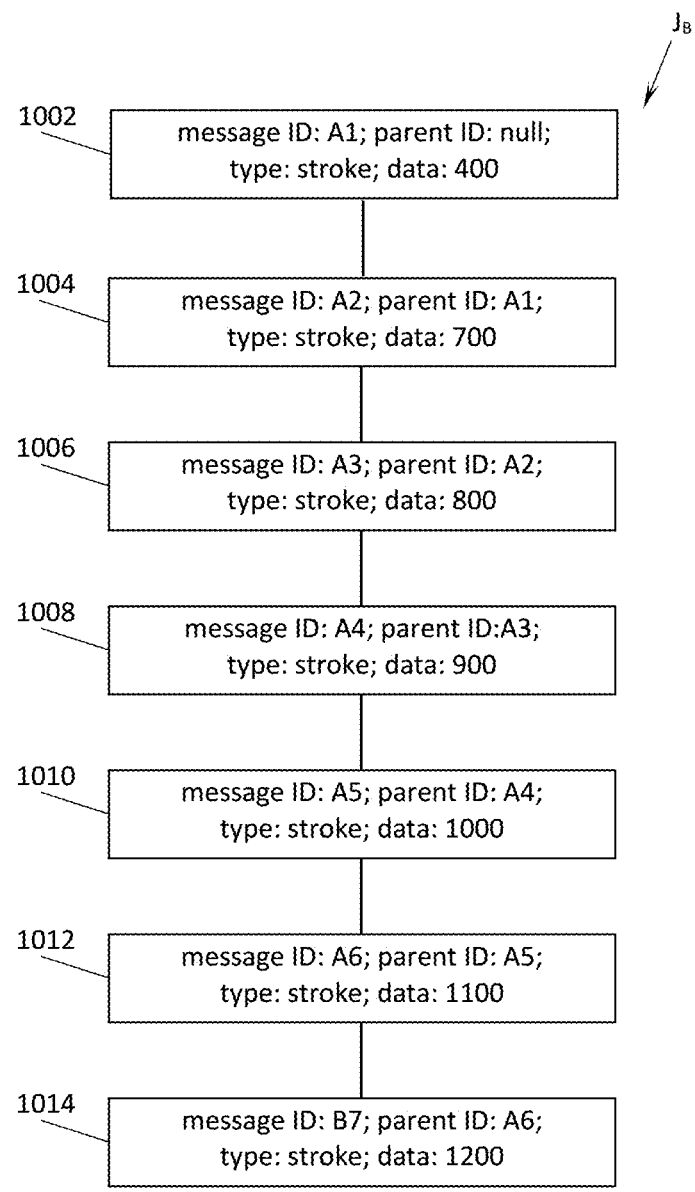
FIGS. 12B and 12C respectively show at least a portion of document journals associated with the documents of FIG. 12A in accordance with an example of the present system and method.

Such sharing of document content modifications with consequential updating of local document journals is performed by the present system and method independent of the actor performing the modification(s). That is, the present system and method does not treat one of the networked devices/actors as a master, with the others treated as slaves. For example, FIG. 12 shows the effect of a modification to the shared document made by the user of the second device 100. That is, in FIG. 12A, the document $D_B$ has subsequent input which has been rendered as digital ink 1200. The input 1200 is handwriting input of multiple strokes representing non-text input which is recognized as a shape, being a complex arrow, and may also be detected as a connector of the containers 400 and 1100. Based on this modification of the document $D_B$, the document management system 112 updates the document journal $J_B$ as shown in FIG. 12B to include a corresponding message 1014, which is the seventh (subsequent) message of the journal. The message 1014 is generated to contain a message ID portion B7, a parent ID portion A6, a type portion "stroke", and a data portion "1200" being the raw and recognized content represented by the digital ink 1200, e.g., the stroke ID.

Figure 12C:
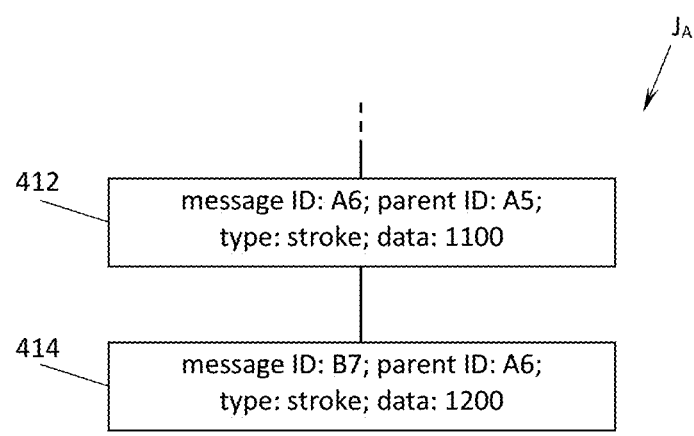

As the document $D_A$ is open for editing or display by the first actor and the devices 100 are connected by the link 302 of the network 12, this update of the journal $J_B$ is communicated to the first actor. As a result, the document management system 112 of the first device updates the document journal $J_A$ to include the data of the shared message 1014 as a corresponding new subsequent message 414 with the associated message and parent IDs and type and content information (as shown in FIG. 12C; the earlier messages of the journal $J_A$ are not depicted for brevity but remain in the journal $J_A$; this is the case in FIGS. 13 to 17 and 19 also). From the journal $J_A$, the version of the document $D_A$ is updated and displayed on the display and input area 300 associated with the first device to include the rendered digital ink 1200 (as shown in FIG. 12A) included in the message content journal $J_A$ based on the type portion of "stroke" and the stroke ID(s) of the associated data portion, as provided by the message content of the shared journal $J_B$.

Further, the actors update their local document version journals based on the shared modification messages, such that the present system and method does not rely on a client or centralized server architecture for collaboration. This non-centralized or local approach to the collaboration model of the present system and method optimizes the communication and processing speed of modifications and allows faithful reproduction of the latest version of a document with full access to previous document versions. via undo and redo for example, even when modification conflicts occur. Such conflicts involve indirect conflicts, in which multiple actors edit non-associated content of the same document substantially simultaneously, and direct conflicts, which occur when multiple actors modify the same or associated content of the same document substantially simultaneously. In the present system and method such conflicts are managed via the document journal model as is now described.

Figure 13A:
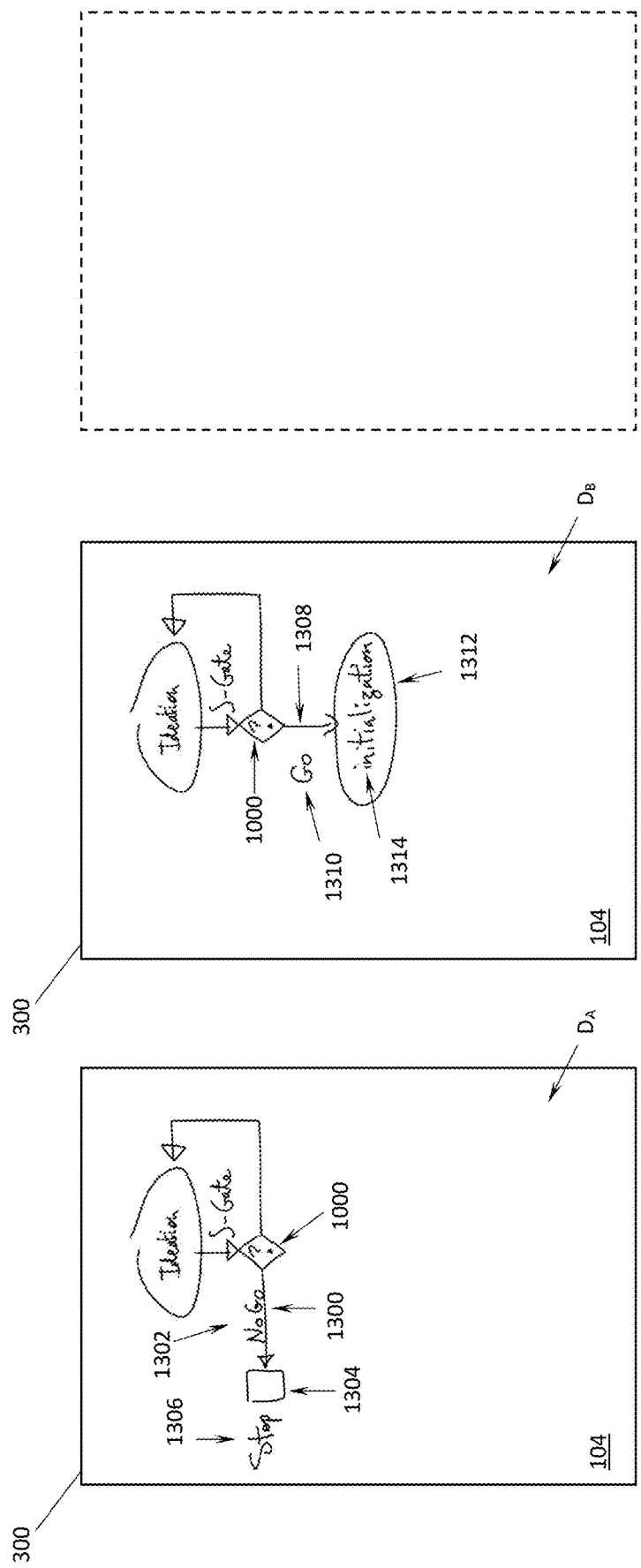
FIG. 13A shows the example documents of FIG. 12A having further handwritten input rendered as digital ink thereon.

FIG. 13A shows the document $D_A$ upon a series of subsequent input which has been rendered as digital ink 1300, 1302, 1304 and 1306, and the document $D_B$ upon a series of subsequent inputs which has been rendered as digital ink 1308, 1310, 1312 and 1314.

With respect to the document $D_A$, the input 1300 is handwriting input of multiple strokes representing non-text input which is recognized as an arrow, and may also be detected as a connector associated with the container 1000. The input 1302 is handwriting input of multiple strokes representing text input which is recognized as the capitalized words "No Go", and may also be detected as a label of the connector 1300. The input 1304 is handwriting input of a single stroke representing non-text input which is recognized as a shape, being a square, and may also be detected as a container associated with the connector 1300. The input 1306 is handwriting input of multiple strokes representing text input which is recognized as the capitalized word "Stop", and may also be detected as a label of the container 1304.

With respect to the document $D_B$, the input 1308 is handwriting input of multiple strokes representing non-text input which is recognized as an arrow, and may also be detected as a connector associated with the container 1000. The input 1310 is handwriting input of multiple strokes representing text input which is recognized as the capitalized word "Go", and may also be detected as a label of the connector 1308. The input 1312 is handwriting input of a single stroke representing non-text input which is recognized as a shape, being an oval, and may also be detected as a container associated with the connector 1308. The input 1314 is handwriting input of multiple strokes representing text input which is recognized as the word "initialization", and may also be detected as content of the container 1312.

Figure 13B:
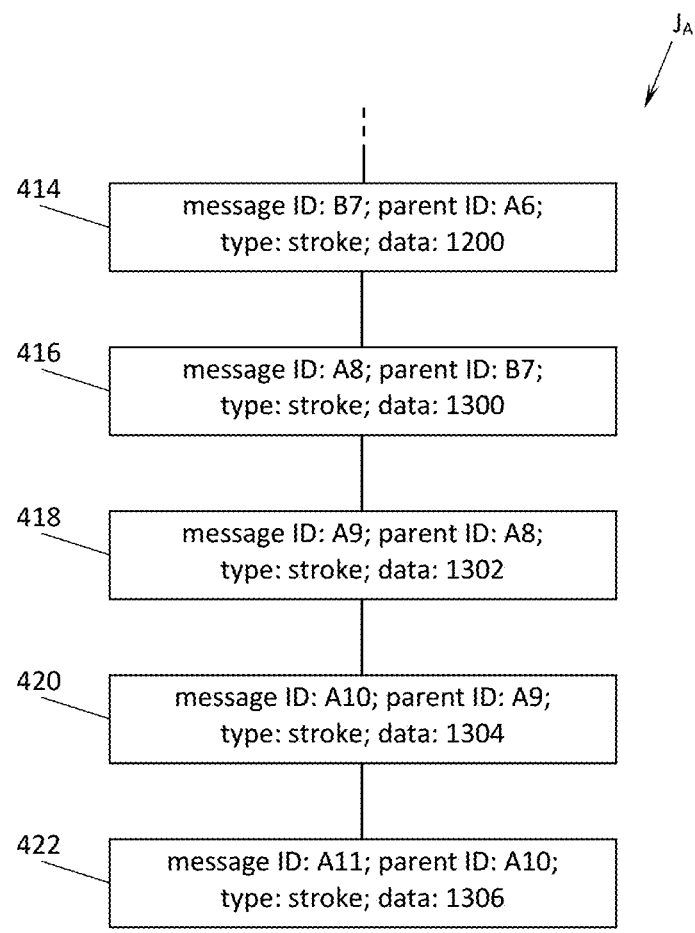
FIGS. 13B and 13C respectively show at least a portion of document journals associated with the documents of FIG. 13A in accordance with an example of the present system and method.
Figure 13C:
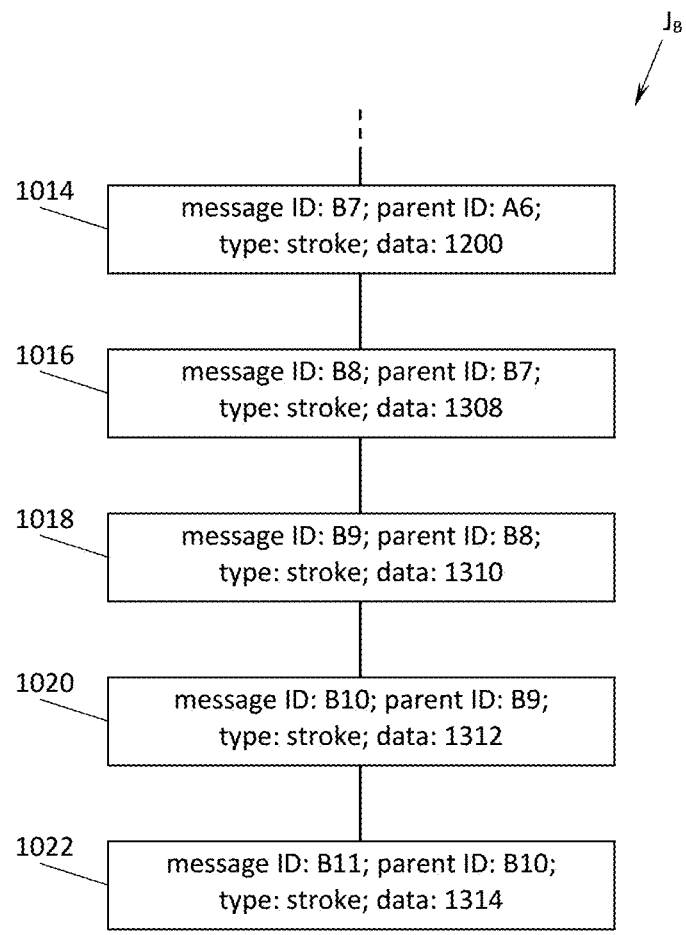

In isolation (for example if the documents are modified while the associated devices 100 are not connected, e.g., off-line, as represented in FIG. 13A by the absence of the link 302 of the network 12), based on these modification inputs of the documents $D_A$ and $D_B$, the document management system 112 would update the document journal $J_A$ as shown in FIG. 13B and the document journal as shown in FIG. 13C.

That is, the document journal $J_A$ is updated to include corresponding messages 416, 418, 420 and 422, which are the eighth to eleventh (subsequent) messages of the journal, respectively. The message 416 is generated to contain a message ID portion A8, a parent ID portion B7, a type portion "stroke", and a data portion "1300" being the raw and recognized content represented by the digital ink 1300. The message 418 is generated to contain a message ID portion A9, a parent ID portion A8, a type portion "stroke", and a data portion "1302" being the raw and recognized content represented by the digital ink 1302. The message 420 is generated to contain a message ID portion A10, a parent ID portion A9, a type portion "stroke", and a data portion "1304" being the raw and recognized content represented by the digital ink 1304. The message 422 is generated to contain a message ID portion A11, a parent ID portion A10, a type portion "stroke", and a data portion "1306" being the raw and recognized content represented by the digital ink 1306.

The document journal $J_B$ on the other hand is updated to include corresponding messages 1016, 1018, 1020 and 1022, which are the eighth to eleventh (subsequent) messages of the journal, respectively. The message 1016 is generated to contain a message ID portion B8, a parent ID portion B7, a type portion "stroke", and a data portion "1308" being the raw and recognized content represented by the digital ink 1308. The message 1018 is generated to contain a message ID portion B9, a parent ID portion B8, a type portion "stroke", and a data portion "1310" being the raw and recognized content represented by the digital ink 1310. The message 1020 is generated to contain a message ID portion B10, a parent ID portion B9, a type portion "stroke", and a data portion "1312" being the raw and recognized content represented by the digital ink 1312. The message 1022 is generated to contain a message ID portion B11, a parent ID portion B10, a type portion "stroke", and a data portion "1314" being the raw and recognized content represented by the digital ink 1314.

These updated journals reflect the content of each journal in the status shown in FIG. 13A, which represent different versions of the shared document. Upon sharing of the messages of the different journals, the document management system associated with each device must reconcile the differences so that each actor not only displays the current version of the shared document but also has a journal which represents a chain of modifications to accessible earlier versions, e.g., through undo, that the other actors can also access. The present system and method handles this reconciliation by building the local document journals taking into account other actors' actions in the same manner as that actor's actions are taken into account, that is, in time-order. For example, when the messages of the document journal of one actor are shared with another actor(s), the relative timing of the local and remote actor(s)'s journal messages is compared so that the resulting updated journal has a message chain that remains time-ordered. As described earlier, this time relative information is provided as part of the message IDs in a manner which provides absolute timing of each message independent of the device used to perform the modification of the message. This is shown by example in FIG. 14.

Figure 14A:
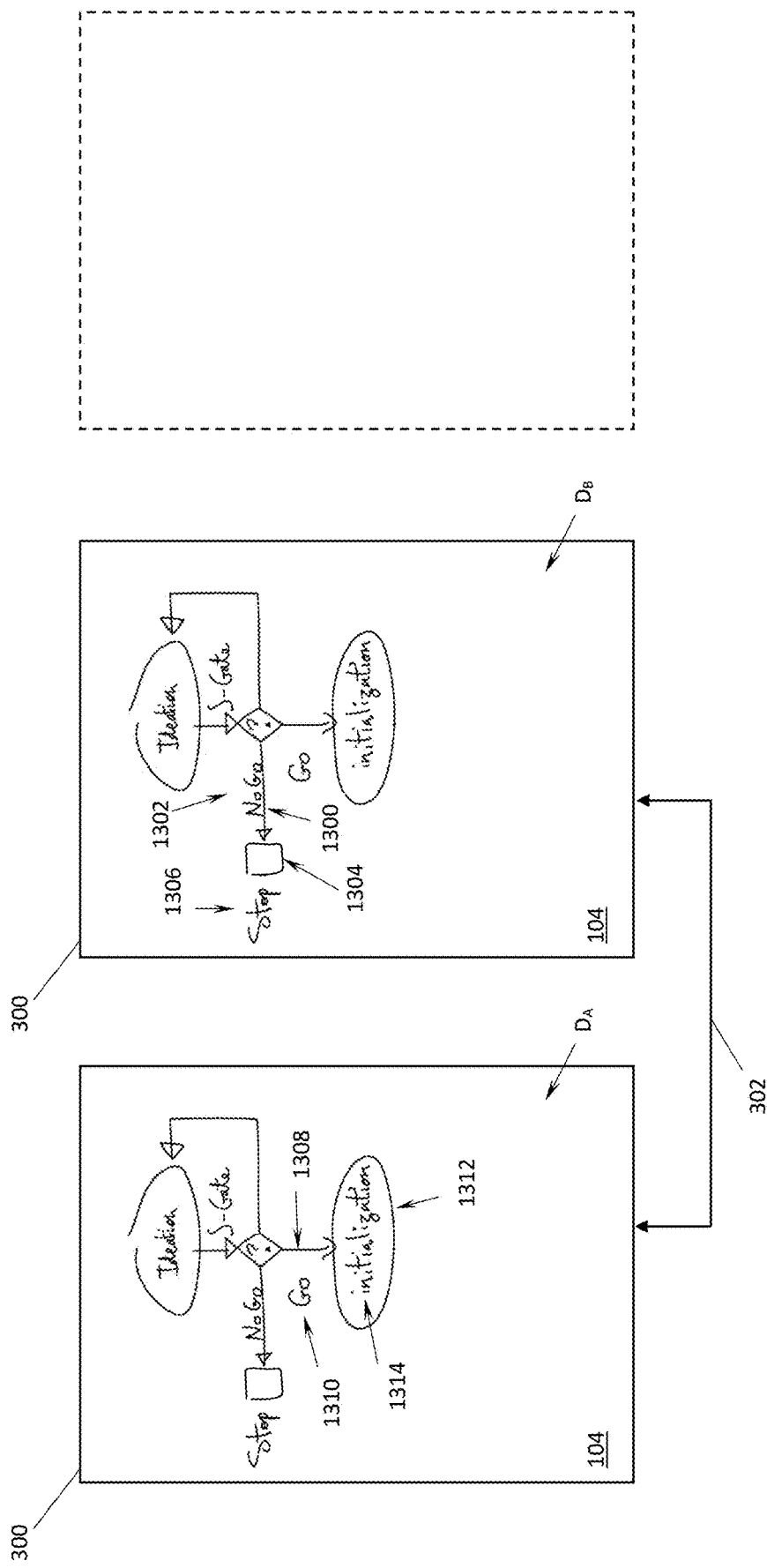
FIG. 14A shows the example documents of FIG. 13A having further handwritten input rendered as digital ink thereon.

FIG. 14A shows the updated display of the documents $D_A$ and $D_B$ by the document management system 112 of each of the devices 100 upon the (re-)connection of the devices via the link 302 of the network 12 with the documents $D_A$ and $D_B$ previously in the states shown in FIG. 13A. As can be seen, each of the documents $D_A$ and $D_B$ is updated to display the current version in which all of the added input 1300 to 1316 are displayed, that is the inputs 1300 to 1306 have been communicated by the (first) device 100 displaying the document $D_A$ to the (second) device 100 displaying the document $D_B$ via the messages 416 to 422 of the journal $J_A$ and the inputs 1308 to 1314 have been communicated by the second device to the first device via the messages 1016 to 1022 of the journal $J_B$.

All of these inputs are used to display both of the documents $D_A$ and $D_B$ because the inputs 1300 to 1316 constitute indirect conflicts of the same document, not direct conflicts of the same document content. The resulting journals $J_A$ and $J_B$ used to build the current version of the shared document, represented by the documents of FIG. 14A, are different however due to this indirect conflict, as follows.

Figure 14B:
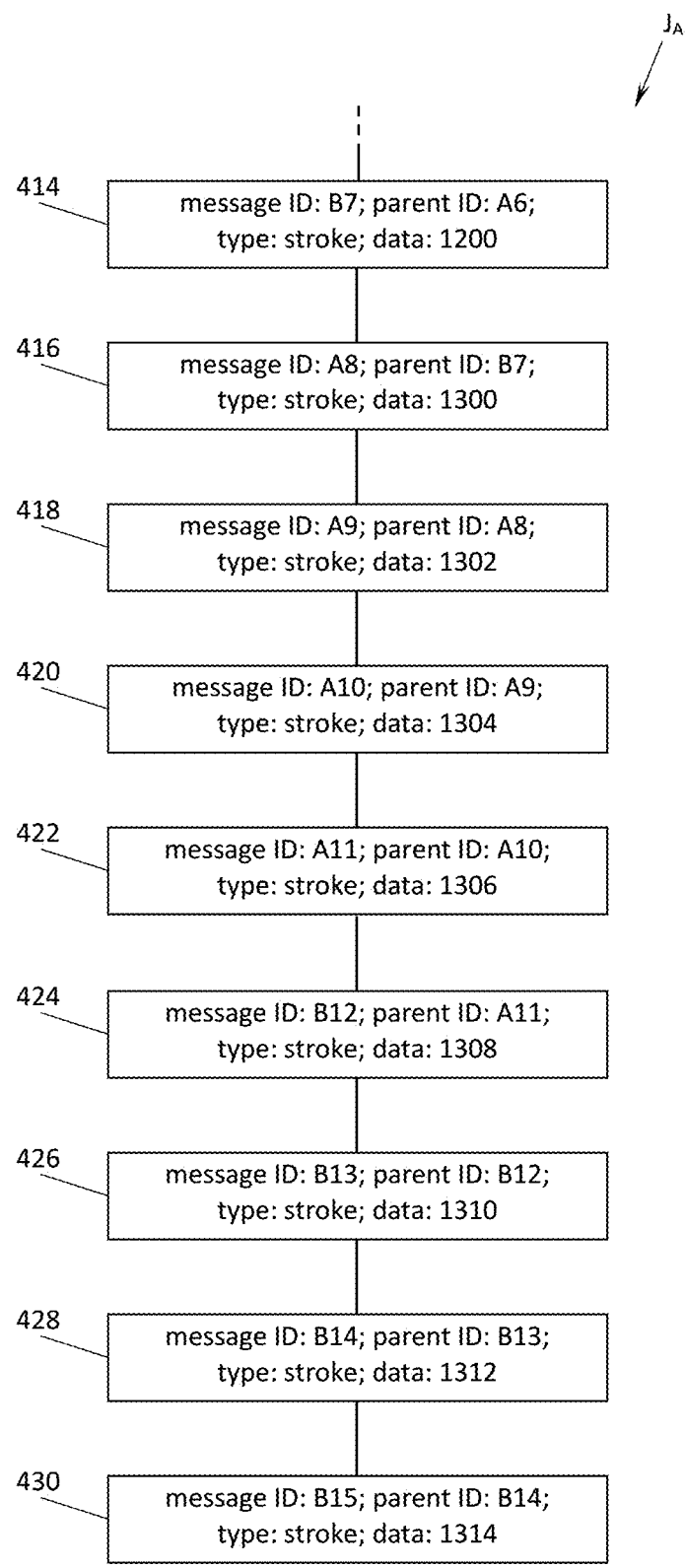
FIGS. 14B and 14C respectively show at least a portion of document journals associated with the documents of FIG. 14A in accordance with an example of the present system and method.

In this example, each of the inputs 1300 to 1306 modifying the document $D_A$ are made before (e.g., in time-order) each of the inputs 1308 to 1314 modifying the document $D_B$. As such, upon receiving the messages 1016 to 1022 of the journal $J_B$, the document management system 112 of the first device 100 determines from the corresponding time information that each of the messages 1016 to 1022 occurred after the final or terminal message of the current blockchain, being message 422, and therefore updates the journal $J_A$ to include these messages as further messages appended to the journal $J_A$. This is shown in FIG. 14B in which a new series of messages 424, 426, 428 and 430, which are the twelfth to fifteenth (subsequent) messages of the journal, are added respectively corresponding to the messages 1016 to 1022. On the other hand, for the journal $J_B$ the communicated messages 416 to 422 of the journal $J_A$ from the first device 100 occurred before the messages 1016 to 1022, and therefore cannot be simply added as is, as multiple messages in the journal would have the same parent ID, making it difficult to correctly build the document, and cannot be simply appended with a new parent ID(s) to the end of the existing journal $J_B$ as the resulting updated journal would not have blocks in time-order.

The present system and method manages this situation of indirect modification conflicts by updating the journal(s) to retain the time-order of messages. In one example, this is achieved by the document management system 112 building the document journal to contain one or more separate blockchains, or branches of blockchains, which stem from a common blockchain.

Figure 14C:
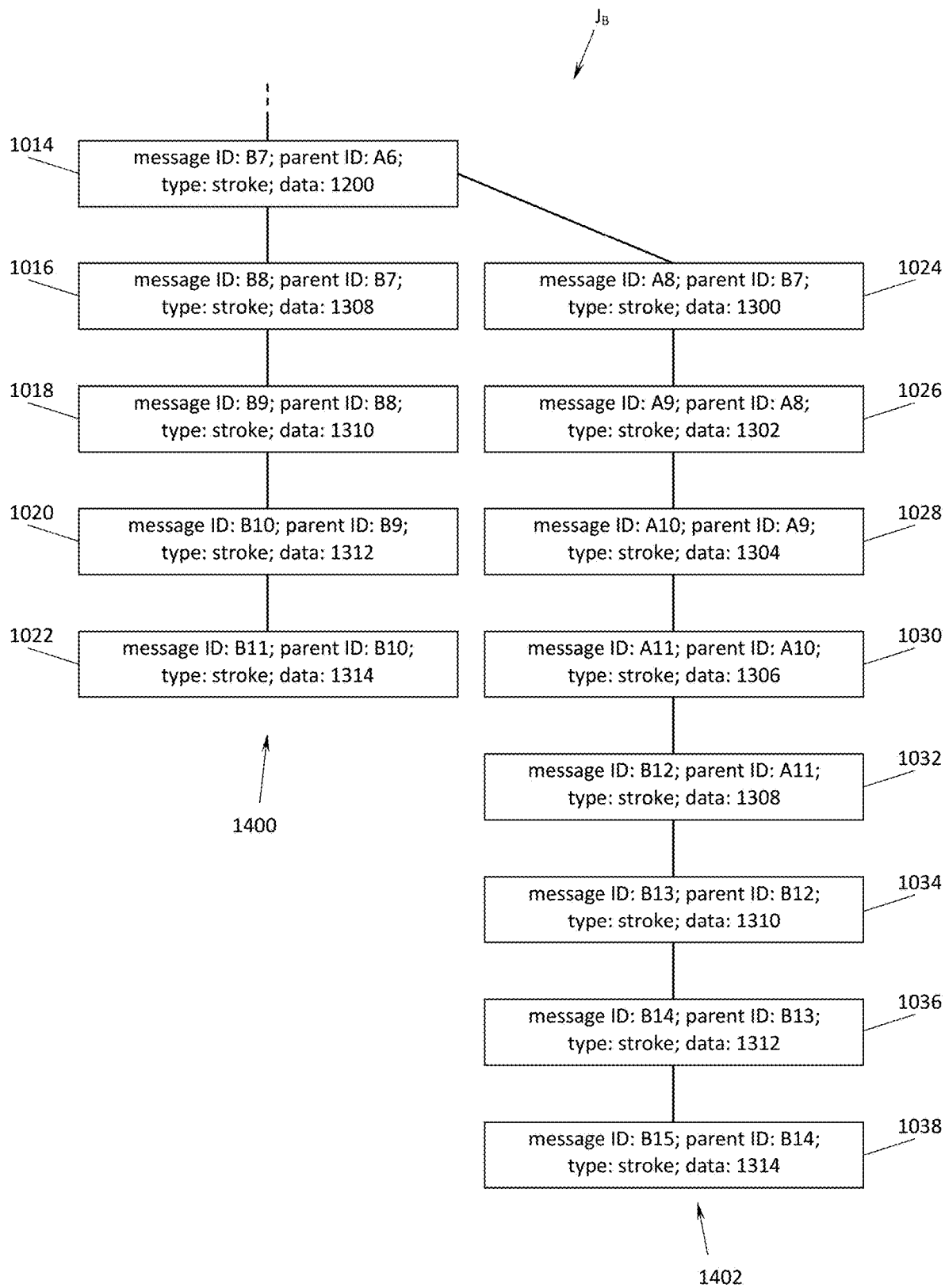

For example, upon receiving the messages 416 to 422 of the journal $J_A$, the document management system 112 of the second device 100 determines from the corresponding time information that each of the messages 416 to 422 occurred before the final or terminal message of the current blockchain, being message 1022, and more specifically before the message 1016. The document management system 112 of the second device 100 therefore updates the journal $J_B$ as shown in FIG. 14C to branch the blockchain at message 1014 (being the final block in time-order before the time of block 416) to include a (first) branch 1400 containing the existing messages 1016 to 1022 (corresponding to a trunk 1400 of the blockchain as depicted) and a (second) branch 1402 in which the earlier messages 416 to 422 of the shared journal $J_A$ are included in sequential order as new messages 1024 to 1030, respectively, and the existing messages 1016 to 1022 are copied and appended thereafter in sequential order as new messages 1032 to 1038, respectively. In this way, the time-order is respected with the earliest time-ordered copied message appended (e.g., immediately after) to the latest time-order branched message. In this branching operation, the message IDs of the copied existing messages 1016 to 1022 are updated as new message IDs B12, B13, B14 and B15, respectively, with corresponding parent ID updates to respect the antecedence of the series of messages in the respective journal branch.

The proper display of the current version from such a branched document journal is handled by the document management system reading the time information of the messages when building the document to compare the time information of the initial (first) message of each branch, and taking that branch having the first message with the earliest time information (e.g., the lowest message ID) to decide which further messages to read in (re-)building the document. This can be seen from the example of FIG. 14, since the content of the time-ordered series of the messages of journal $J_A$ shown in FIG. 14B is the same as the content of the time-ordered series of the messages of journal $J_B$ in a path following the blockchain into the second branch 1402 shown in FIG. 14C, such that the resulting rendering of the digital ink in both of the documents $D_A$ and $D_B$ is the same as shown in FIG. 14A.

By this branching embodiment of the present system and method, the local journals are built with a 'tree' structure such that later indirectly conflicted modification messages are appended after earlier indirectly conflicted modification messages in the journal of the shared document, in a manner of 'auto-correction'. As such, any new build of the shared document, e.g., on a newly connected device, is made from that journal. As a result, all sharing devices are able to display the latest version of the shared document and access earlier versions, such as through undo, a look-up of the journal, or other appropriate mechanism.

Further, all existing messages are retained in each local journal but the messages of 'terminated' branches or chains are not taken into account when building the local version of the shared document. These terminated messages cannot be subsequently visualized or manipulated by that local actor, however forensic analysis of the local document build from the journal could be performed to detect any errors, for example.

As an alternative example, the present system and method could update the document journals with indirectly conflicted modification messages so that earlier time-stamped messages are inserted before later time-stamped messages without creating multiple paths or branches as discussed above. While such an alternative example may result in the same final display of the current version of the shared document, the resulting journals would be altered from earlier versions in a such a manner that the local journal does not contain all existing messages, which may lead to errors in the local document build.

The present system and method may utilize the same document journal model, being the use of a tree structure of the local document journals, to reconcile direct conflicts together with certain pre-defined conditions or rules applied with respect to certain modification conflicts, as is now described.

Figure 15A:
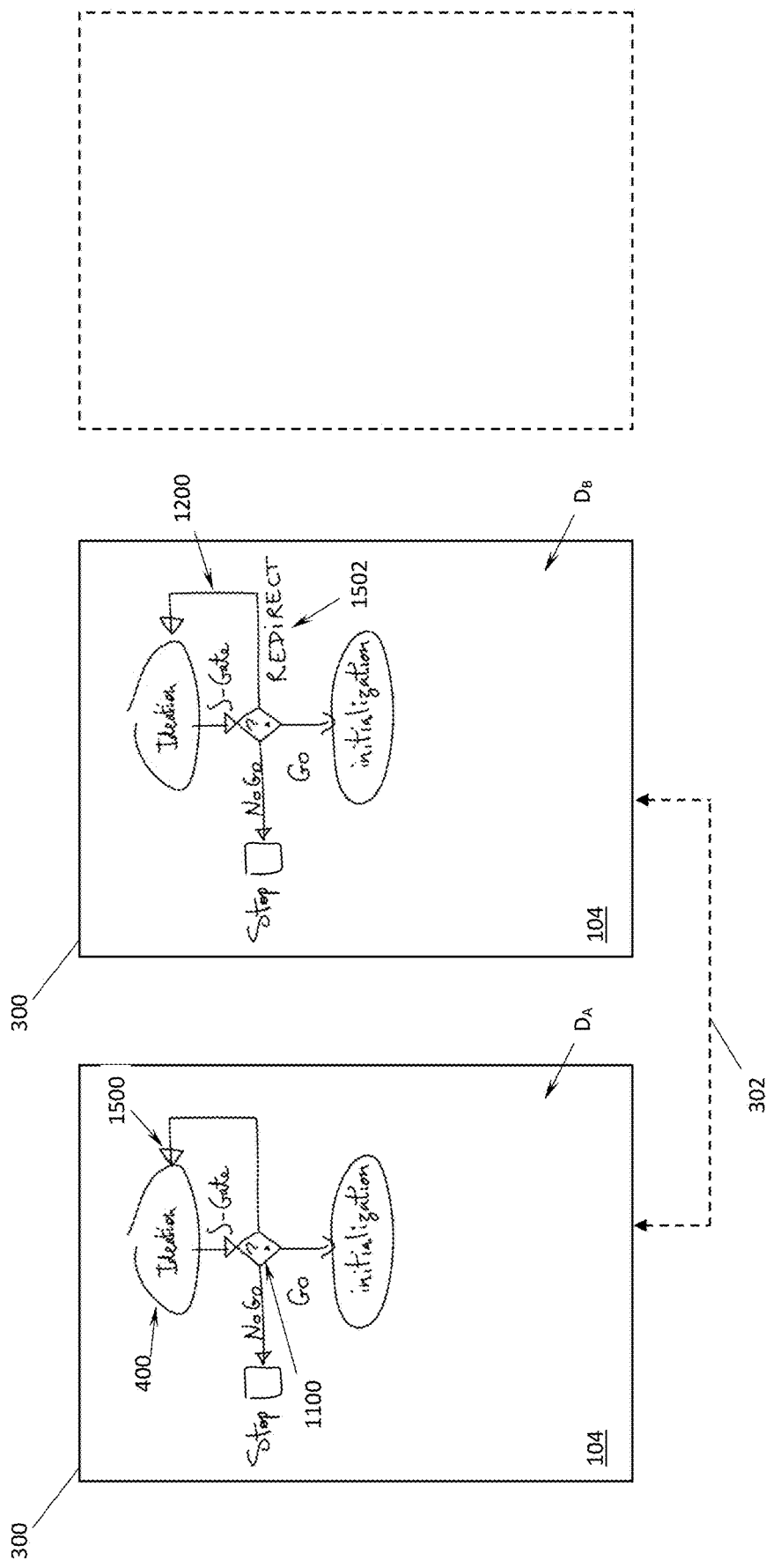
FIG. 15A shows the example documents of FIG. 14A having further handwritten input rendered as digital ink thereon.

FIG. 15A shows the document $D_A$ upon a subsequent input (or series of inputs) which has been rendered as digital ink 1500, and the document $D_B$ upon a subsequent input which has been rendered as digital ink 1502.

With respect to the document $D_A$, the input leading to the rendering of the digital ink 1500 is a resizing command or operation of the handwriting input corresponding to the digital ink 1200, being the arrow or connector between the inputs or containers 400 and 1100. Such an operation may involve the user simply performing a multi-point gesture to select an end portion of the digital ink 1200 and move it closer to, or so that it 'touches', the digital ink 400, e.g., by a press and drag or push at the arrowhead of the arrow, or a single-point or multi-point gesture to automatically join the detected connector 1200 to the detected container 400 via diagram connector logic employed by the document management system 112 and/or the HWR system 114, as described in the afore-incorporated by reference U.S. patent application Ser. No. 14/955,155, e.g., by a tap or double tap at the arrowhead of the arrow. Accordingly, the digital ink 1500 is rendered as the resulting resized digital ink 1200.

With respect to the document $D_B$, the input 1502 is handwriting input of multiple strokes representing text input which is recognized as the all-capitalized word "REDIRECT", and may also be detected as a label of the connector 1200.

In embodiments of the present system and method in which the diagrammatic relationship of the non-text and text elements of the document content is not determined, the input 1500 associated with the document $D_A$ causes an indirect modification conflict with the input 1502 associated with the document $D_B$ whether the devices displaying the respective documents are connected or not during the modifications. If the devices are not connected, and are connected later, the post-update or adjustment of the respective journals is performed as described earlier with respect to which input occurred first. If the devices are connected and the respective documents are open for editing or display, the respective journal updates are communicated in real-time such that the local journal and document display updates are performed in real-time, e.g., substantially immediately after the journal updates are received by the respective actors.

Such real-time updates may not be particularly disturbing to the different users as portions or content elements of the document other than that being interacted with by each user are updated. This depends however on the nature and extent of the modifications. Accordingly, a certain lapse of time after the last interaction by a user, determined by the associated document management system 112 from a pen-up event, for example, may be observed before performing the document display update from the updated journal. This time lapse should not be defined to be too long however, to minimize the potential for indirect conflicts to become direct conflicts. For example, a time lapse of about 0.1 seconds to about 0.8 seconds may be suitable as pre-defined by the document management system and/or settable by users via the UI or the like.

Such user experience issues may not be a concern during a collaboration session, for example, since the collaborators are expecting the document to be modified by the others and may be in communication, such as via voice and/or text chat. On the other hand, in non-collaboration scenarios, such as a user opening a document to work on it without prior knowledge that the document is being modified by one or more other users, these user experience concerns are more pronounced. However, the afore-described mechanisms for conflict resolution in a timely manner perhaps coupled with communication to the user by the associated document management system that the document is open elsewhere for viewing and editing, may alleviate these issues, without needing to 'lock' editing of the document as is conventional.

In embodiments of the present system and method in which the diagrammatic relationship of the non-text and text elements of the document content is determined, the input 1500 associated with the document $D_A$ causes a direct modification conflict with the input 1502 associated with the document $D_B$ whether the devices displaying the respective documents are connected or not during the modifications. This is because, the respective document management systems 112 and/or HWR systems 114 of the devices 100 (as connected or upon connection) need to take into account modifications of related diagram elements.

In the present example, the labelling of the connector 1200 with the label 1502 is the same as the labelling of the connector 1500 with the label 1502, since the respective rendered positions of the connector 1500 and the label 1502 in the resulting updated shared document are not affected by the rendering of the other content element. If the rendered positions were effected, the present system and method may cause an alert to be displayed to one or more of the actors communicating the conflict, determine remedial action via different rendering of the digital ink of one or more of the related elements, or determine that the conflict resolution of the document journal model itself eliminates the conflict, such as will be seen later with respect to other modifications like the 'erase' modification type.

Figure 15B:
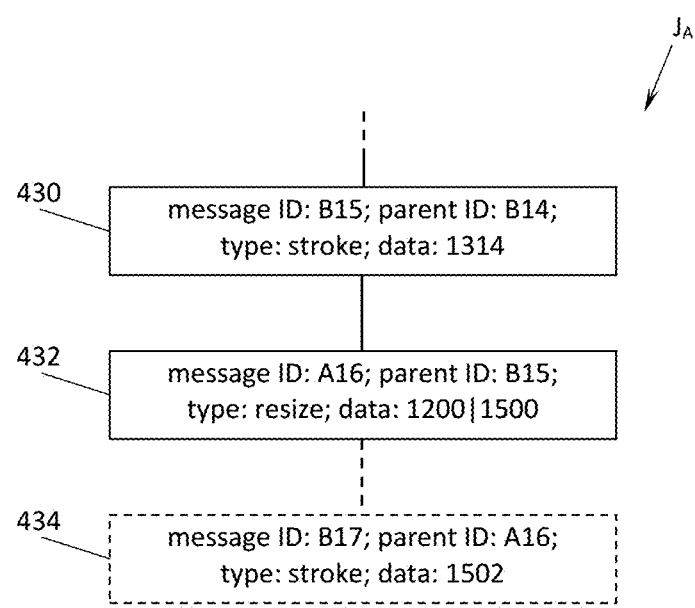
FIGS. 15B and 15C respectively show at least a portion of document journals associated with the documents of FIG. 15A in accordance with an example of the present system and method.
Figure 15C:
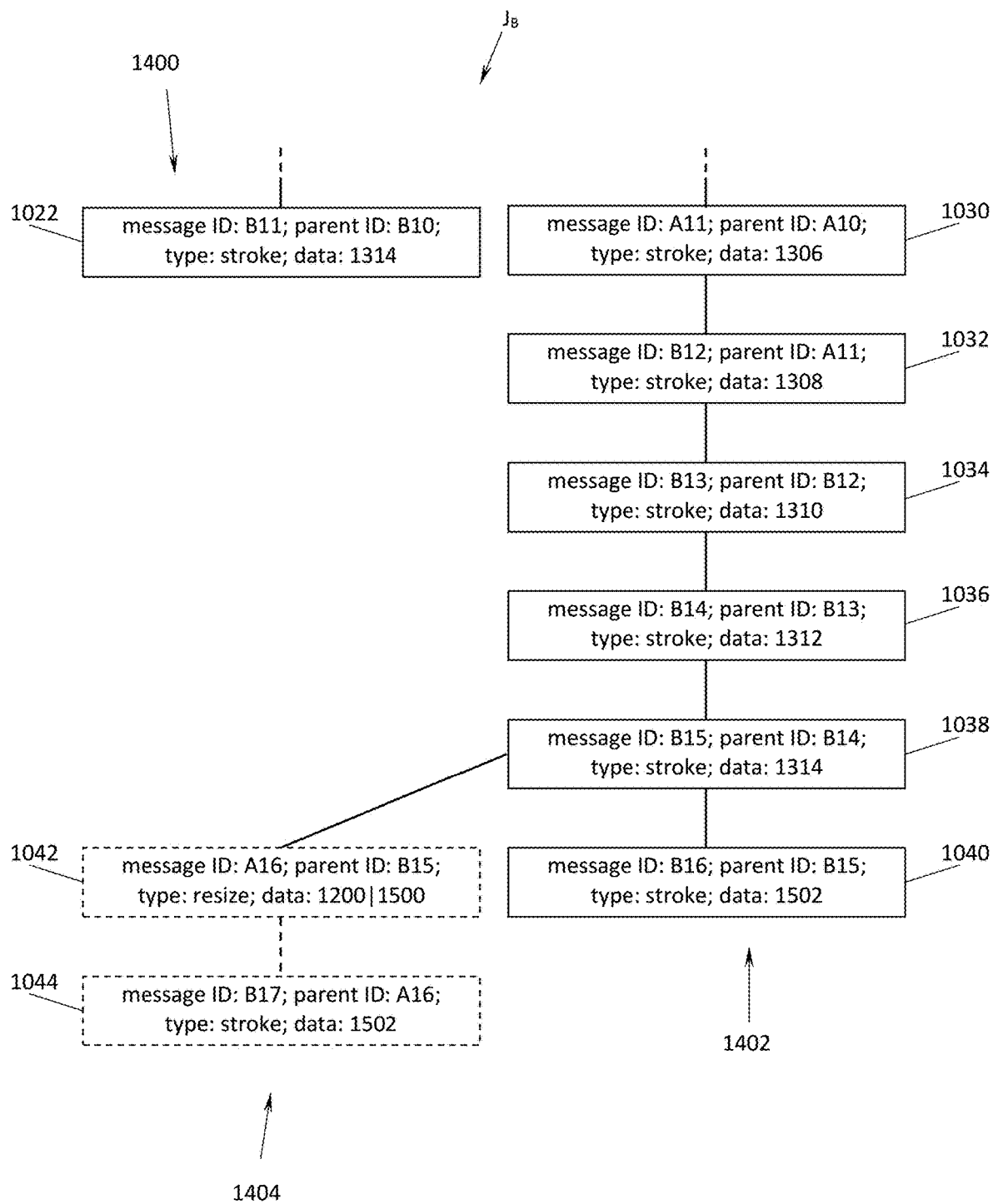

As before, the example of FIG. 15 involves conflicting input to the same (shared) document, and as such the document journal of each actors' version of the document is updated to reflect the action(s) taken by the other actor(s) in a manner which maintains integrity of the ink. The journals $J_A$ and $J_B$ of the documents $D_A$ and $D_B$ are built as shown in FIGS. 15B and 15C, respectively, where the input 1500 associated with the document $D_A$ occurs before the input 1502 associated with the document $D_B$. In these drawings, and those following, the dashed elements indicate branches and messages of the journals that are built as the messages from the other actor(s) are received and analyzed by the respective document management system.

With respect to the document $D_A$, the resize operation is handled by the document management system 112 of the first actor as a single step modification, however with two components. The first component is the detection of the selection gesture for selecting the existing strokes corresponding to the recognized ink being resized by the gesture and the second component is the resizing of the existing strokes corresponding to the recognized resized ink. Accordingly, in the present example the content corresponding to the digital ink 1200 is to be resized as digital ink 1500.

As a result, the journal $J_A$ is updated to include message 432, which is the sixteenth (subsequent) message of the journal, corresponding to the input 1500. The message 432 is generated to contain a message ID portion A16, a parent ID portion B15, a type portion "resize", and a modification data portion specific for the resize modification.

For the 'resize' modification type, the modification data includes the content input that is being resized and the resulting resized content. The content that is being resized includes the identification of the 'stroke' data of that content and the resulting resized content includes the resized ink strokes, e.g., the stroke ID of the strokes being resized. The resized content includes the coordinates of the resized ink and the recognition result associated therewith, e.g., one or more stroke IDs of the resized strokes. The recognition and rendering of the resized ink may be performed by the present system and method as described in afore-incorporated by reference U.S. patent application Ser. No. 14/955,155. Accordingly, each actor receiving journal messages from other actors receives the identity of the strokes of the raw ink that are being acted upon and the recognition results therefor in the modification data. As such, the document management system 112 of the receiving actor(s) is able to re-render the corresponding digital ink in their version of the shared document and interaction with the rendered digital ink is substantially immediately possible without requiring re-recognition, as with the stroke modification type.

Additionally, or alternatively, the 'resize' modification data portion may include the gesture ink input together with the interacted ink identification, i.e., the ink strokes being resized. In this example, the gesture ink is the received handwritten or hand-drawn input designating the resizing operation, such as the multi- or single-point gestures discussed earlier. The inclusion of the gesture ink constitutes the communication of the ink object(s), as described earlier.

Alternatively, or additionally, still, the 'resize' modification data portion may include only the relative stroke coordinates which represent the raw ink of the resize gesture. In such an alternative example the document management system 112 and/or HWR system 114 of each device 100 is required to recognition process the data portion of each message of a document journal when the messages are shared.

Further, the 'resize' modification data portion may also include the message ID (and parent ID) of the 'stroke' type message originally associated with the strokes being resized. In this way, links between the messages that modify other messages of the resulting journal can be deduced, which may assist in the detection of errors, for example.

The described modification data are examples and are non-exhaustive, such that it is understood that other or more data types (formats) can be provided in the document journal messages. In any case, as before, the 'stroke' data of the modification data may act as data to identify the strokes, e.g., one or more stroke IDs.

In the illustrated example, as shown in FIG. 15B, the content input that is being resized is designated in the modification data portion of the message 432 by "1200" being the raw and recognized content represented by the digital ink 1200 being resized. As described earlier, the modification data portion of the message 432 may also include the message ID B7 and parent ID A6 of the message 412 of the journal $J_A$ associated with the content 1200. The resulting resized content is designated in the modification data portion of the message 432 by "1500" being the resized content represented by the digital ink 1500.

With respect to the document $D_B$, the journal $J_B$ is updated to include message 1040 in the branch 1402, which is the sixteenth (subsequent) message of the journal, corresponding to the input 1502. The message 1040 is generated to contain a message ID portion B16, a parent ID portion B15, a type portion "stroke", and a modification data portion "1502" being the raw and recognized content represented by the digital ink 1502.

In a situation where both the documents $D_A$ and $D_B$ are open for editing or display by the respective first and second actors, the devices 100 are connected by the link 302 of the network 12, and the inputs 1500 and 1502 occur within a relatively short space of time or 'time-window' (e.g., about 0.1 seconds to about 0.5 seconds), the updates of the journal $J_A$ and $J_B$ are communicated to the other actor after the initial (first) digital ink renderings of FIG. 15A. In this case, the renderings are updated as discussed earlier upon updating (or rebuilding) of the respective journal versions to include the corresponding edited and added strokes 1500 and 1502 (e.g., see FIG. 16A).

In particular, as a result of receiving the other actors' updated journal messages, the document management system 112 of the first device updates the document journal $J_A$ to include the data of the shared message 1040 as a corresponding new subsequent message 434 with the associated message and parent IDs and type and content information (as shown in FIG. 15B), and the document management system 112 of the second device updates the document journal $J_B$ to further branch the blockchain at the message 1038 of the branch 1402 containing the existing messages 1024 to 1040 to form a (third) branch 1404 in which the earlier message 432 of the shared journal $J_A$ is included as a new message 1042 and the existing message 1040 is appended thereafter as a new message 1044 (as shown in FIG. 15C). As before, in this branching operation, the message ID of the copied existing message 1040 is updated as a new message ID B17, with the corresponding parent ID update to respect the antecedence of the messages in the respective journal branch.

Figure 16A:
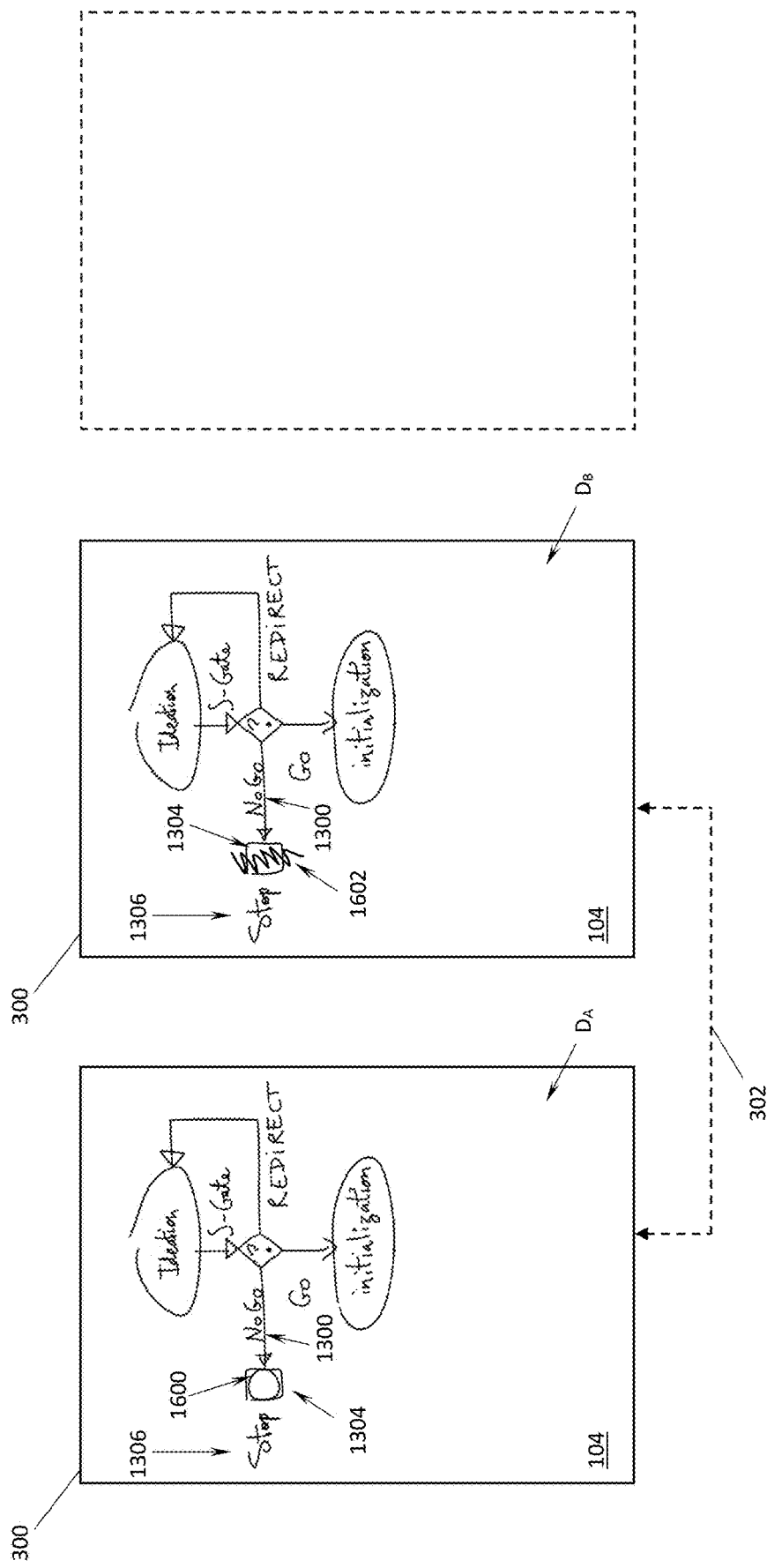
FIG. 16A shows the example documents of FIG. 15A having further handwritten input rendered as digital ink thereon.

Thus, from the journal $J_A$ the version of the document $D_A$ is updated and displayed on the display and input area 300 associated with the first device to include the rendered digital ink 1502 (as shown in FIG. 16A) based on the type portion of "stroke" and the stroke ID(s) of the associated data portion, as provided by the message content of the shared journal $J_B$, and from the journal $J_B$ the version of the document $D_B$ is updated and displayed on the display and input area 300 associated with the second device to include the rendered (resized) digital ink 1500 (as shown in FIG. 16A) based on the type portion of "resize" and the stroke IDs of the associated data portion, as provided by the message content of the shared journal $J_B$.

Due to the nature of the modifications of example of FIG. 15, the resulting displayed current versions of the shared document would be the same if the modifications to each version of the document depicted in FIG. 15A had been performed in the reverse order, e.g., the input 1502 was performed before the input 1500. In this case the content of the messages 432 and 434 of the resulting journal $J_A$ and the messages 1042 and 1044 of the resulting journal $J_B$ would have been in the reverse order also. A modification example in which this may not be the case is described later.

The resizing operation of the example of FIG. 15 may alternatively be treated by the present system and method as a replacement operation of the strokes involved for the purposes of the document journal. That is, an erasure of the strokes and addition of new strokes (which are resized versions of the erased strokes) may be captured in the messages of the journal. The resulting (re-)build of the document is the same for either case. FIG. 16 illustrates an example replacement operation on the document $D_A$ having a direct conflict with an example erase operation on document $D_B$.

That is, FIG. 16A shows the document $D_A$ upon a subsequent input which has been rendered as digital ink 1600, and the document $D_B$ upon a subsequent input which has been rendered as digital ink 1602.

With respect to the document $D_A$, the input leading to the rendering of the digital ink 1600 is an overdrawing operation of the handwriting input corresponding to the digital ink 1304, being the square or container 1304. The input 1600 is handwriting input of a single stroke representing non-text input which is recognized as a shape, being a circle, and may also be detected as a container associated with the connector 1300. In response to this action, the document management system 112 and/or the HWR system 114 detects that the shape, i.e., the square, represented by the existing content 1304 is to be replaced by the shape, i.e., the circle, represented by the new content 1600. This detection may be performed as described in the afore-incorporated by reference U.S. patent application Ser. No. 14/955,155.

With respect to the document $D_B$, the input leading to the rendering of the digital ink 1602 is also an overdrawing operation of the handwriting input corresponding to the digital ink 1304, being the square or container 1304. The input 1602 is handwriting input of a single stroke representing gesture input which is recognized as an erase gesture, being a scratch-out. In response to this action, the document management system 112 and/or the HWR system 114 detects that the shape, i.e., the square, represented by the existing content 1304 is to be erased in accordance with the erase gesture, i.e., the scratch-out, represented by the new content 1602. This detection may be performed as described in the afore-incorporated by reference U.S. patent application Ser. No. 14/955,155.

In the illustrated example, the erase gesture, or editing stroke(s), 1602 is displayed as digital ink corresponding to the digital ink representation of the input raw ink of the gesture. However, the document management system 112, and or the processor 106 of the device 100, may be configured to display editing stroke(s) with a pre-defined shape or some other appropriate rendering. This rendered editing digital ink may be performed for a certain amount of time, e.g., for about 0.1 seconds to about 0.5 seconds or until the recognized editing operation is performed (e.g., the erased ink is omitted from display), and then gradually faded from display, for example. In this case, the display of the detected editing gesture may be used to provide recognition feedback to users with respect to recognition of the gesture itself and the relative location thereof. Alternatively, the editing operation of the detected gesture may be performed without display of the editing digital ink, such that the display of the completed editing operation itself is used for such feedback.

Figure 16B:
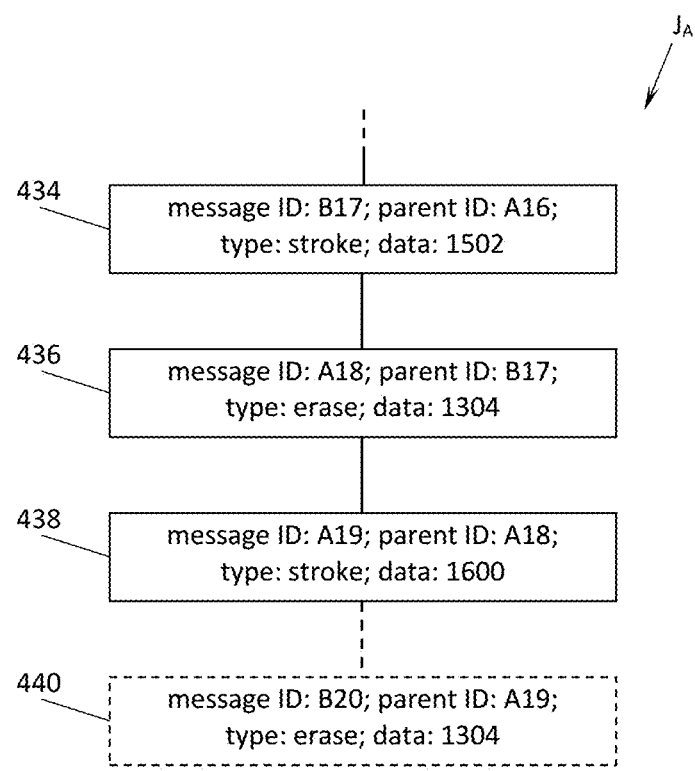
FIGS. 16B and 16C respectively show at least a portion of document journals associated with the documents of FIG. 16A in accordance with an example of the present system and method.
Figure 16C:
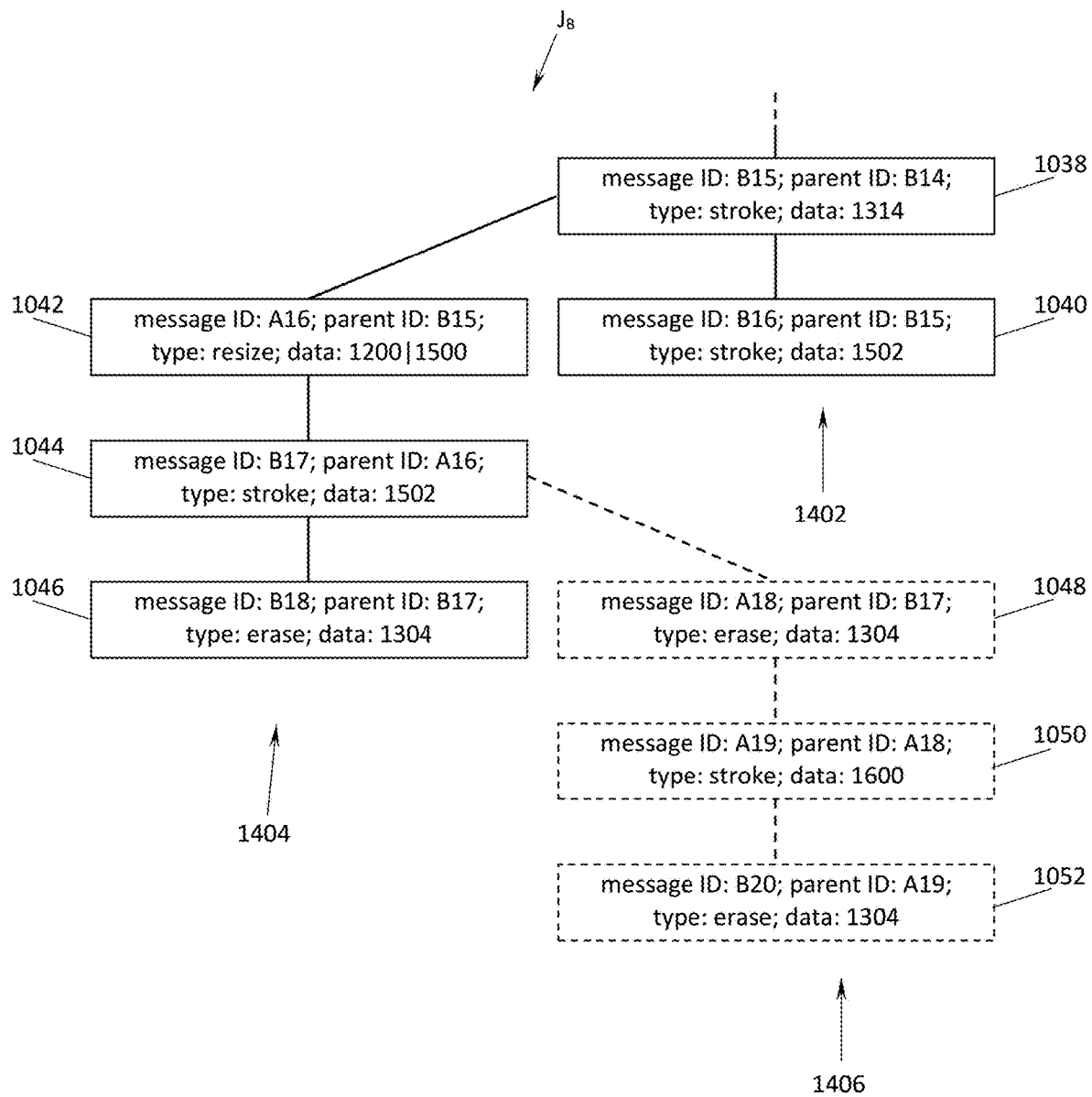

As before, the example of FIG. 16 involves conflicting input to the same shared document, and as such the document journal of each actors' version of the document is updated to reflect the action(s) taken by the other actor(s) in a manner which maintains integrity of the ink. The journals $J_A$ and $J_B$ of the documents $D_A$ and $D_B$ are built as shown in FIGS. 16B and 16C, respectively, where the input 1600 associated with the document $D_A$ occurs before the input 1602 associated with the document $D_B$.

Figure 17A:
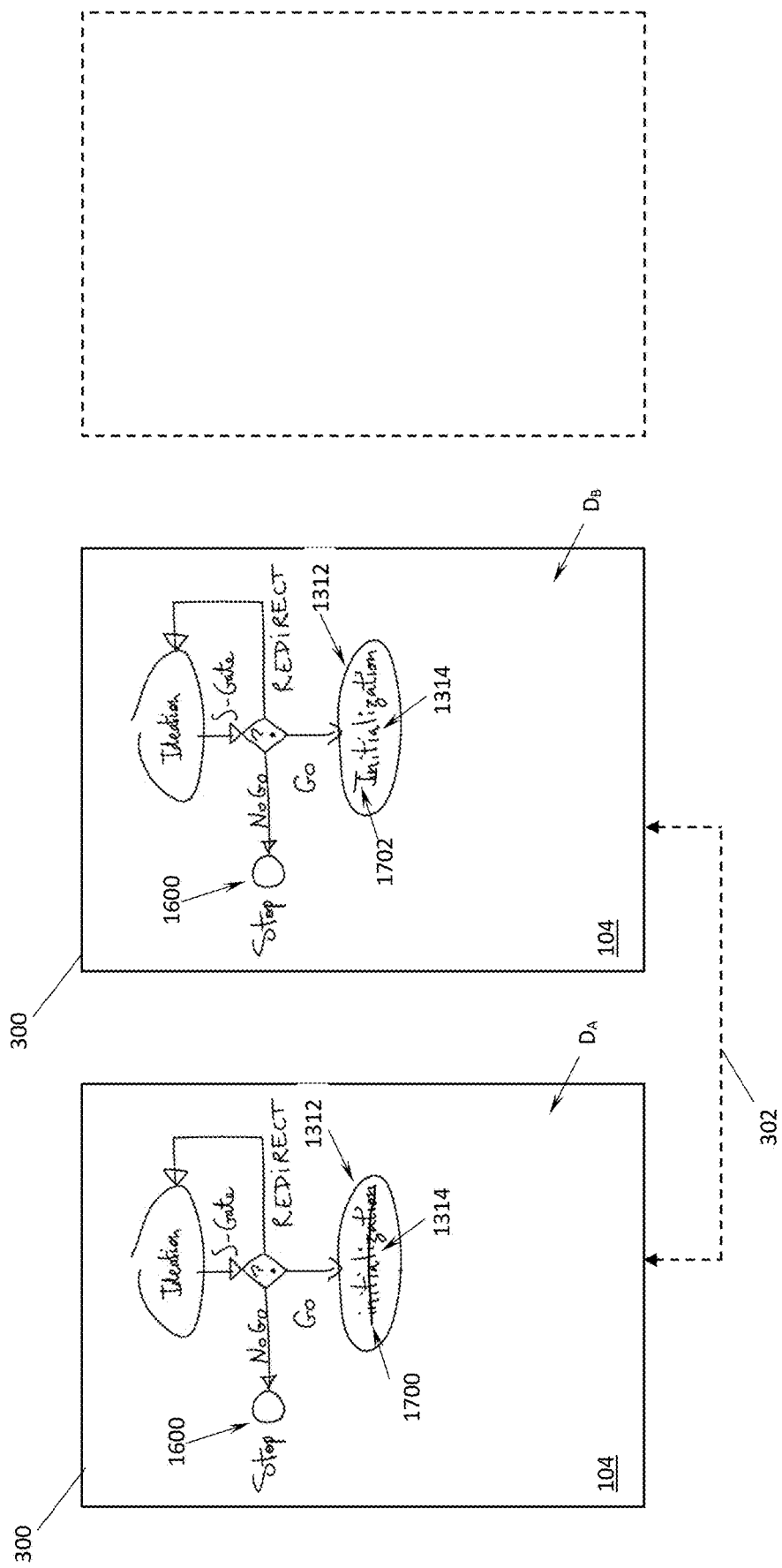
FIG. 17A shows the example documents of FIG. 16A having further handwritten input rendered as digital ink thereon.

With respect to the document $D_A$, the overwrite operation is handled by the document management system 112 of the first actor as a two step modification. The first step is the erasure of the existing strokes corresponding to the recognized ink being overwritten and the second step is the addition of new strokes corresponding to the newly recognized ink. Accordingly, in the present example the content corresponding to the digital ink 1304 is to be erased and then the content corresponding to the digital ink 1600 is to be added (as shown in FIG. 17A).

As a result, the journal $J_A$ is updated to include subsequent messages 436 and 438, which are the nineteenth and twentieth (subsequent) messages of the journal, corresponding to the erasure of input 1200 and input 1600, respectively. The message 436 is generated to contain a message ID portion A18, a parent ID portion B17, a type portion "erase", and a modification data portion specific for the erase modification. The message 438 is generated to contain a message ID portion A20, a parent ID portion A19, a type portion "stroke", and a data portion "1600" being the raw and recognized content represented by the digital ink 1600.

With respect to the document $D_A$, the erase operation is handled by the document management system 112 of the second actor as a single step modification, however with two components that are similar to the steps of the overwrite operation and like the components of the afore-described resize operation. The first component is the detection of the erase gesture for erasing the existing strokes corresponding to the recognized ink being overwritten by the gesture and the second component is the erasure of the existing strokes corresponding to the recognized ink being erased (overwritten). Accordingly, in the present example the content corresponding to the digital ink 1304 is to be erased.

As a result, the journal $J_B$ is updated to include a subsequent message 1046 in the branch 1404, which is the nineteenth (subsequent) message of the journal, corresponding to the erasure of input 1304. The message 1046 is generated to contain a message ID portion B18, a parent ID portion B17, a type portion "erase", and a modification data portion specific for the erase modification.

For the 'erase' modification type, the modification data includes the content input that is being erased. The content that is being erased includes the identification of the 'stroke' data of that content, e.g., the stroke ID(s). Accordingly, each actor receiving journal messages from other actors receives the identity of the strokes of the raw ink that are being acted upon in the modification data. As such, the document management system 112 of the receiving actor(s) is able to re-render the corresponding digital ink in their version of the shared document (in this erasure case, omitting that digital ink) and interaction with the rendered digital ink is substantially immediately possible without requiring re-recognition, as with the stroke modification type.

Additionally, or alternatively, the 'erase' modification data portion may include the gesture ink input together with the interacted ink identification, i.e., the ink strokes being erased. In this example, the gesture ink is the received handwritten or hand-drawn input designating the erase operation, such as the overwrite and scratch-out gestures discussed earlier. Other erase gestures are possible however, and example of which is described later. The inclusion of the gesture ink constitutes the communication of the ink object(s), as described earlier.

Alternatively, or additionally, still, the 'erase' modification data portion may include only the relative stroke coordinates which represent the raw ink of the erase gesture. In such an alternative example the document management system 112 and/or HWR system 114 of each device 100 is required to recognition process the data portion of each message of a document journal when the messages are shared.

Further, the 'erase' modification data portion may also include the message ID (and parent ID) of the 'stroke' type message originally associated with the strokes being erased. In this way, links between the messages that modify other messages of the resulting journal can be deduced, which may assist in the detection of errors, for example.

The described modification data are examples and are non-exhaustive, such that it is understood that other or more data types (formats) can be provided in the document journal messages. In any case, as before, the 'stroke' data of the modification data may act as data to identify the strokes, e.g., one or more stroke IDs.

In the illustrated example, for the erase message of journal $J_A$ the content input that is being erased is designated in the modification data portion of the message 436 by "1304" being the raw and recognized content represented by the digital ink 1304 being overwritten, as shown in FIG. 16B. As described earlier, the modification data portion of the message 436 may also include the message ID A10 and parent ID A9 of the message 420 of the journal $J_A$ associated with the content 1304. For the erase message of journal $J_B$ the content input that is being erased is designated in the modification data portion of the message 1046 by "1304" being the raw and recognized content represented by the digital ink 1304 being erased, as shown in FIG. 16C. The modification data portion of the message 1046 may also include the message ID A10 and parent ID A9 of the message 1028 of the journal $J_B$ associated with the content 1304. As can be seen, the modification data portion of these erase messages include the same content, as expected since the erase operations refer to the same content.

In a situation where both the documents $D_A$ and $D_B$ are open for editing or display by the respective first and second actors, the devices 100 are connected by the link 302 of the network 12, and the inputs 1600 and 1602 occur within a relatively short space of time or 'time-window' (e.g., about 0.1 seconds to about 0.5 seconds), the updates of the journal $J_A$ and $J_B$ are communicated to the other actor after the initial (first) digital ink renderings of FIG. 16A. In this case, the renderings are updated as discussed earlier upon updating (or rebuilding) of the respective journal versions to include the corresponding edited and added strokes 1600 and 1602 (e.g., see FIG. 17A).

In particular, as a result of receiving the other actors' updated journal messages, the document management system 112 of the first device updates the document journal $J_A$ to include the data of the shared message 1046 as a corresponding new subsequent message 440 with the associated message and parent IDs and type and content information (as shown in FIG. 16B), and the document management system 112 of the second device updates the document journal $J_B$ to further branch the blockchain at the message 1044 of the branch 1404 containing the existing messages 1042 to 1046 to form a (fourth) branch 1406 in which the earlier messages 436 and 438 of the shared journal $J_A$ are included as new messages 1048 and 1050, respectively, and the existing message 1046 is appended thereafter as a new message 1062 (as shown in FIG. 16C). As before, in this branching operation, the message ID of the copied existing message 1046 is updated as a new message ID B20, respectively, with corresponding parent ID update to respect the antecedence of the messages in the respective journal branch.

Thus, from the journal $J_B$ the version of the document $D_B$ is updated and displayed on the display and input area 300 associated with the second device to include the rendered digital ink 1600 (as shown in FIG. 17A) based on the type portions of "erase" and "stroke" and the stroke IDs of the associated data portions, as provided by the message content of the shared journal $J_A$, such that both of the updated documents $D_A$ and $D_B$ include the circle (container) 1600 in place of the previous square (container) 1304. While the message 1046 of the journal $J_B$, that is the erase operation, is also shared the content thereof is not used by the document management system 112 of the first device in order to update the document $D_A$, or is used by the document management system 112 but has no effect when applied. This is because, the erase operation represented by the message pertains to ink of the document $D_A$ which has already been erased, namely by the earlier message 436 of the corresponding journal $J_A$.

Despite this non-effect, the inclusion of redundant messages in the document journal model by the present system and method ensures that a 'true' journal of the document exists and that errors in handing the omission of certain actions do not occur. However, it is possible for the present system and method to be configured so that such omissions of redundant messages is performed.

Due to the nature of the modifications of example of FIG. 16, the resulting displayed current versions of the shared document would be the same if the modifications to each version of the document depicted in FIG. 16A had been performed in the reverse order, e.g., the input 1602 was performed before the input 1600. However, in this case the content of the message 440 would be before that of the messages 436 and 438 in the resulting journal $J_A$ and the message 1052 would be before that of the messages 1048 and 1050 in the resulting journal $J_B$. An example of an erase operation on the document $D_A$ having a direct conflict with an example operation on the document $D_B$ in which this reversal of order does have an effect is now described with respect to FIG. 17.

FIG. 17A shows the document $D_A$ upon a subsequent input which has been rendered as digital ink 1700, and the document $D_B$ upon a subsequent input which has been rendered as digital ink 1702.

With respect to the document $D_A$, the input leading to the rendering of the digital ink 1700 is an erase (overdrawing) operation of the handwriting input corresponding to the digital ink 1314, being the text content 1314 of the container 1312. The input 1700 is handwriting input of a single stroke representing gesture input which is recognized as an erase gesture, being a strike-through. In response to this action, the document management system 112 and/or the HWR system 114 detects that the text, i.e., the word "initialization", represented by the existing content 1314 is to be erased. This detection may be performed as described in the afore-incorporated by reference U.S. patent application Ser. No. 14/955,155.

With respect to the document $D_B$, the input leading to the rendering of the digital ink 1702 is also an overwriting operation of a portion of the handwriting input corresponding to the digital ink 1314. The input 1702 is handwriting input of a multiple strokes representing text input which is recognized as a capitalized character, being the letter "I". In response to this action, the document management system 112 and/or the HWR system 114 detects that at least a portion of the text, i.e., the letter "i" beginning the recognized word "initialization", represented by the existing content 1314 is to be replaced by the character, i.e., the capital letter "I", represented by the new content 1702. This detection may be performed similar to the detection of the overwriting gestures described earlier.

Figure 17B:
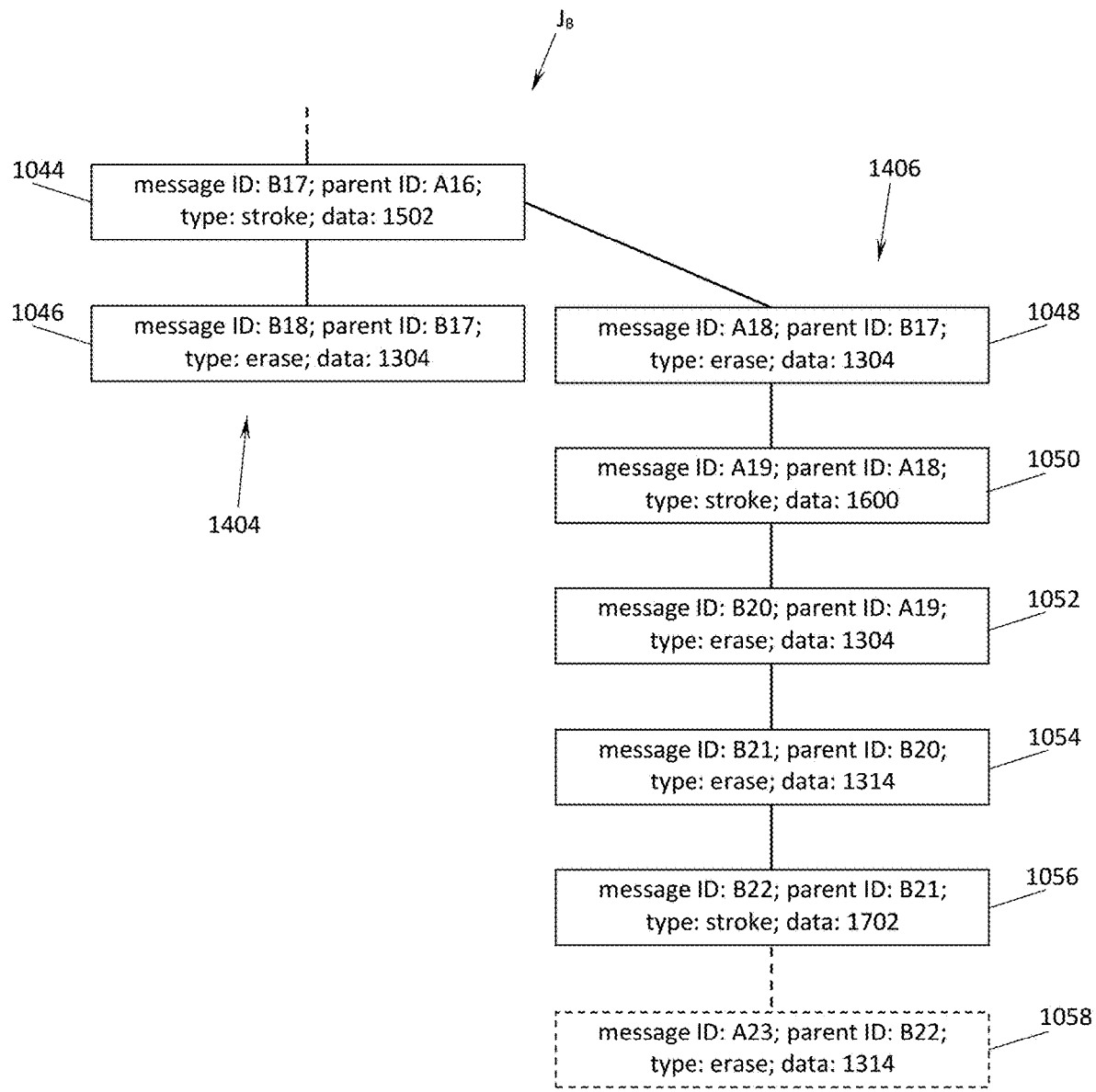
FIGS. 17B and 17C respectively show at least a portion of document journals associated with the documents of FIG. 17A in accordance with an example of the present system and method.
Figure 17C:
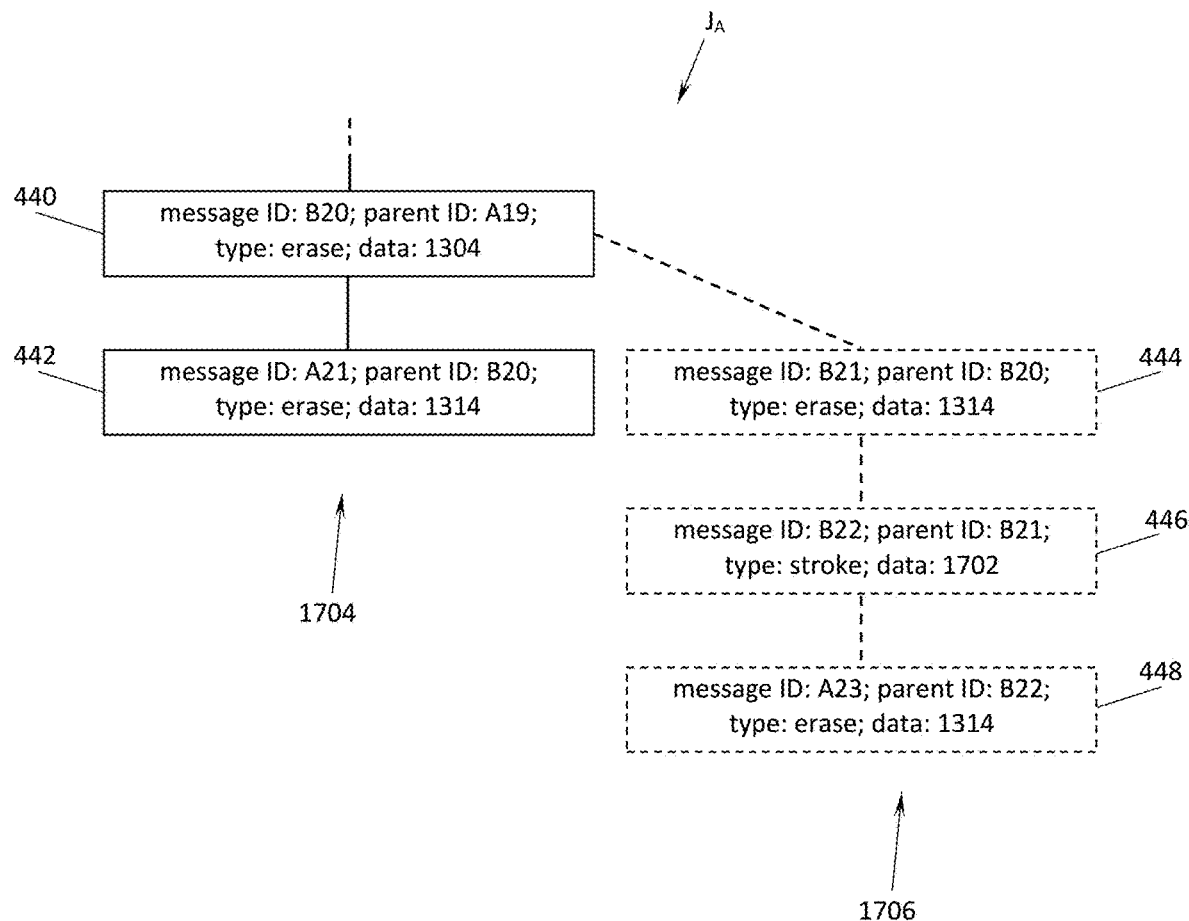

As before, the example of FIG. 17 involves conflicting input to the same shared document, and as such the document journal of each actors' version of the document is updated to reflect the action(s) taken by the other actor(s) in a manner which maintains integrity of the ink. The journals $J_B$ and $J_A$ of the documents $D_B$ and $D_A$ are built as shown in FIGS. 17B and 17C, respectively, where the input 1702 associated with the document $D_B$ occurs before the input 1700 associated with the document $D_A$.

With respect to the document $D_B$, the overwrite operation is handled by the document management system 112 of the second actor as before to include erasure and stroke addition modification steps. However, unlike the earlier described overwriting examples, the example overwrite operation of FIG. 17 involves the overwriting of only a portion of a recognized element of the shared document content. Depending on how this is handled by the present system and method, the resulting consequential document updates may be different. For example, the HWR system 114, through the language model employed by the language expert 126, may be configured to recognize that the newly added character "I" is intended by the user to replace the initial character "i" of the already recognized word "initialization". In that case, the HWR system 114 returns a new recognition result of the capitalized word "Initialization" to the document management system 112.

On the other hand, if the document management system 112, and/or HWR system, does not employ such a language model, e.g., in a handwriting recognition system that does not employ at least word-level semantics; such as a character-based recognition system, the erasure of the initial character "i" of the already recognized word "initialization" will result in the content "nitialization" being returned separately from the newly recognized character "I".

These different techniques have consequences for the shared document model. For the former case, the whole of the content corresponding to the digital ink 1314 is to be erased and then the content corresponding to the digital ink 1702 is to be added. As a result, the journal $J_B$ is updated to include subsequent messages 1054 and 1056, which are the twenty-first and twenty-second (subsequent) messages of the journal, corresponding to the erasure of input 1314 and then input corresponding to the digital ink 1702, respectively (as shown in FIG. 17B). The message 1054 is generated to contain a message ID portion B21, a parent ID portion B20, a type portion "erase", and a modification data portion including "1314" being the raw and recognized content represented by the digital ink 1314 being overwritten. The modification data portion of the message 1054 may also include the message ID B15 and parent ID B14 of the message 1038 of the journal $J_B$ associated with the content 1314. The message 1056 is generated to contain a message ID portion B22, a parent ID portion B21, a type portion "stroke", and a data portion "1702" being the raw and recognized content represented by the digital ink 1702.

On the other hand, for the latter case, only a portion of the content corresponding to the digital ink 1314 is to be erased and the content corresponding to the digital ink 1702 is to be added. As a result, the message 1054 is generated with the same message and parent ID and type portions, but with a modification data portion including only those stroke coordinates of the content 1314 that are being erased, e.g., the one or more stroke IDs of those strokes that are to be erased or replaced. The impact of these different journal updates is explained later. Alternatively, a chain of messages may be generated representing the complete erasure of the existing content 1314 (e.g., like the message 1054 of FIG. 17B), the addition of strokes related to the remaining portion of the partially erased content 1314 (e.g., a new 'stroke' type message containing modification data of the remaining stroke coordinates and associated recognition result) and the addition of the new strokes 1702 (e.g., like the message 1056 of FIG. 17B).

With respect to the document $D_A$, the erase operation is handled by the document management system 112 of the first actor as before to include gesture detection and erase components. Accordingly, in the present example the content corresponding to the digital ink 1314 is to be erased. As a result, the journal $J_A$ is updated to include a subsequent message 442 which is the twenty-first (subsequent) message of the journal, corresponding to the erasure of input 1314. The message 442 is generated to contain a modification data portion including "1314" being the raw and recognized content represented by the digital ink 1314 being overwritten, as shown in FIG. 17C. The modification data portion of the message 442 may also include the message ID B15 and parent ID B14 of the message 430 of the journal $J_A$ associated with the content 1314.

As can be seen, the modification data portion of these erase messages for the journals $J_A$ and $J_B$ include the same content for the semantic recognition example, as expected since the erase operations refer to the same content. Accordingly, for this example, in a situation where both the documents $D_A$ and $D_B$ are open for editing or display by the respective first and second actors, the devices 100 are connected by the link 302 of the network 12, and the inputs 1700 and 1702 occur within a relatively short space of time or 'time-window' (e.g., about 0.1 seconds to about 0.5 seconds), the updates of the journal $J_A$ and $J_B$ are communicated to the other actor after the initial (first) digital ink renderings of FIG. 17A. In this case, the renderings are updated as discussed earlier upon updating (or rebuilding) of the respective journal versions to include the results of the corresponding edited and added strokes 1700 and 1702 (e.g., see FIG. 18A).

In particular, as a result of receiving the other actors' updated journal messages, the document management system 112 of the second device updates the document journal $J_B$ to include the data of the shared message 442 as a corresponding new subsequent message 1058 with the associated message and parent IDs and type and content information (as shown in FIG. 17B), and the document management system 112 of the first device updates the document journal $J_A$ to branch the blockchain at the message 440 to form a (first) branch 1704 containing the existing messages 400 to 442 (corresponding to a trunk 1704 of the blockchain as depicted) and to form a (second) branch 1706 in which the earlier messages 1054 and 1056 of the shared journal $J_B$ are included as new messages 444 and 446, respectively, and the existing message 442 is appended thereafter as a new message 448 (as shown in FIG. 17C). As before, in this branching operation, the message ID of the copied existing message 442 is updated as a new message ID A23, respectively, with corresponding parent ID update to respect the antecedence of the messages in the respective journal branch.

Figure 18A:
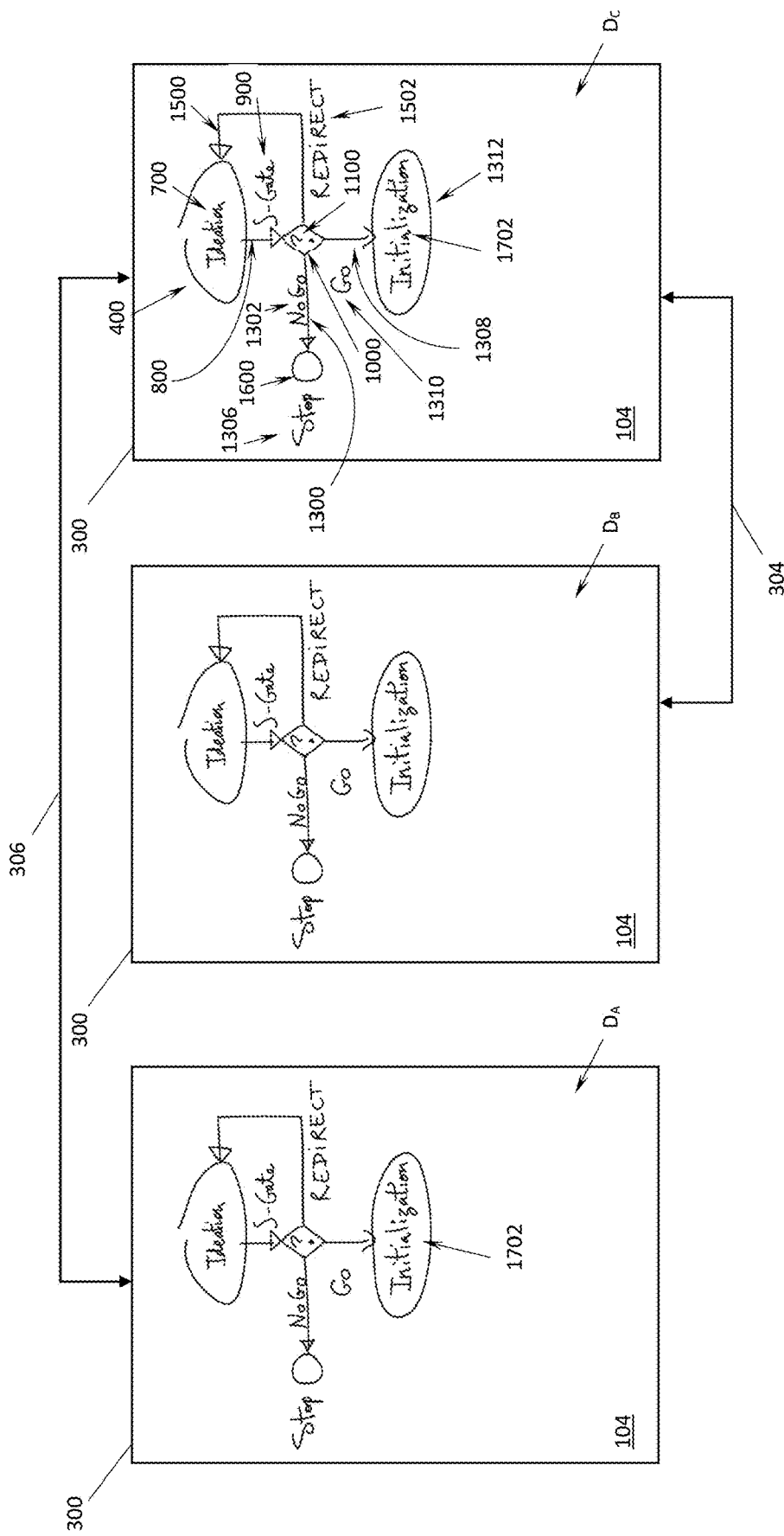
FIG. 18A shows the example documents of FIG. 17A having further handwritten input rendered as digital ink thereon and a further example document displayed on the display and input area of another of the computing devices having the digital ink rendered thereon.

Thus, from the journal $J_A$ the version of the document $D_A$ is updated and displayed on the display and input area 300 associated with the first device to include the rendered digital ink 1702 (as shown in FIG. 18A) based on the type portions of "erase" and "stroke" and the stroke IDs of the associated data portions, as provided by the message content of the shared journal $J_B$, such that both of the updated documents $D_A$ and $D_B$ include the capitalized word "Initialization" in place of the previous non-capitalized word "initialization" 1314. As before, the erase operation of message 442 of the journal $J_A$, while also shared has no effect when applied. As such, in this example the resulting document versions of the shared document would be the same if the modification events 1700 and 1702 were conducted in the reverse order.

However, for the other example in which the whole of the content 1314 is not erased by the erase operation 1702 different results are obtained based on the time-order of the events 1700 and 1702, or otherwise undesirable results may occur.

For example, if like the previous example, the modification(s) of the second actor occurs first, the newly recognized content 1702 of the character "I" and the partly erased content 1314 of "nitialization" are communicated to the first actor to be processed prior to the erase operation 1700 of the first actor on all of the content 1314.

If the message 1054 has been generated as described earlier to have a modification data portion including only those stroke coordinates (stroke ID(s)) of the content 1314 that are being erased, this creates a direct conflict in which the modification data of the erase messages of the first and second actors are different for the same content, not the same as in the previous example. As a result, the document management system may either ignore the subsequent erase message of the journal $J_A$ (e.g., messages 448 and 1058 for each journal respectively), since the content to which it pertains is altered, and therefore strictly no longer exists, or still action this erase message resulting in the remaining portion of the content 1314 being erased. The former case is the same as before, however the latter case would result in only the digital ink 1702 representing the input of the second actor, namely the letter "I", being displayed. In these cases, simple undoing (described later) of the last action by one of the actors would return the display to that of FIG. 18A.

The same result as the latter case occurs if the modification of the first actor occurs first, since the whole of the content 1314 is erased by the erase message of the first journal $J_A$ first, such that the subsequent partial erase message of the second journal $J_B$ is ignored by the document management systems 112, or is otherwise ineffective on non-existing content, such that only the input of the second actor, namely the letter "I", is displayed. However, undoing of the last action would only omit the letter "I" such that the intended modification would not result. This would therefore require further user interaction to re-write the text content of the container 1312, for example.

On the other hand, if the message 1054 has been generated as described earlier to have a modification data portion including a chain of messages representing the complete erasure of the existing content 1314, the addition of strokes related to the remaining portion of the partially erased content 1314, and the addition of the new strokes 1702, this creates a direct conflict in which the modification data of the erase messages of the first and second actors are the same, as in the previous example. As a result, independent of the time-order of the modifications, the result includes both the digital ink 1702 representing the input of the second actor, namely the letter "I", and the digital ink of the partial input 1314, namely the partial word "nitialization" being displayed, as in FIG. 18A.

As can be deduced from the above, the use of at least word-level semantic handwriting recognition improves the user experience of the present system and method, however character-level approaches may also provide satisfactory results.

As described earlier, the journal can be shared via the network 12 with more devices 100. Upon receiving the journal, the document management system 112 local to such other devices 100 renders the digital ink represented by the messages of the journal so that the document is reproduced on those devices 100. For example, FIG. 18A shows the shared document as represented by the documents $D_A$ and $D_B$ at the first and second devices 100 based on the example of FIG. 17, which has been communicated to a (third) device 100 via either or both of the links 304 and 306 of the network 12.

Figure 18B:
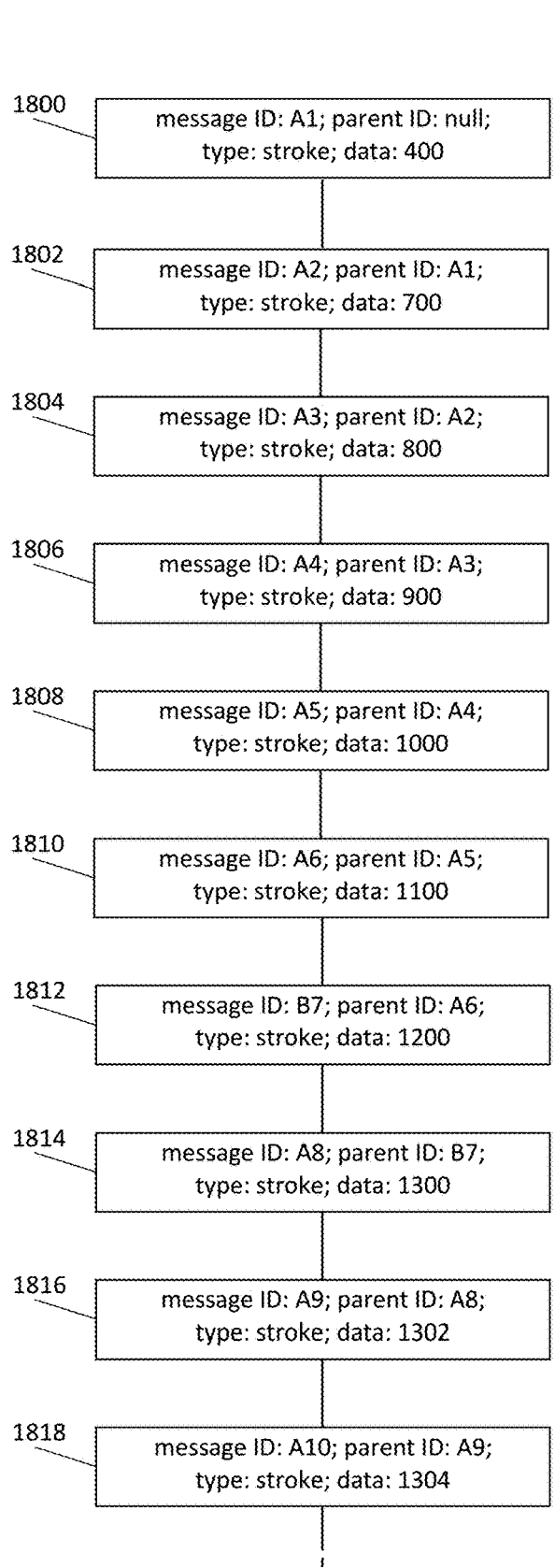
FIGS. 18B, 18C and 18D sequentially show portions of a document journal associated with the further example document of FIG. 18A in accordance with an example of the present system and method.
Figure 18C:
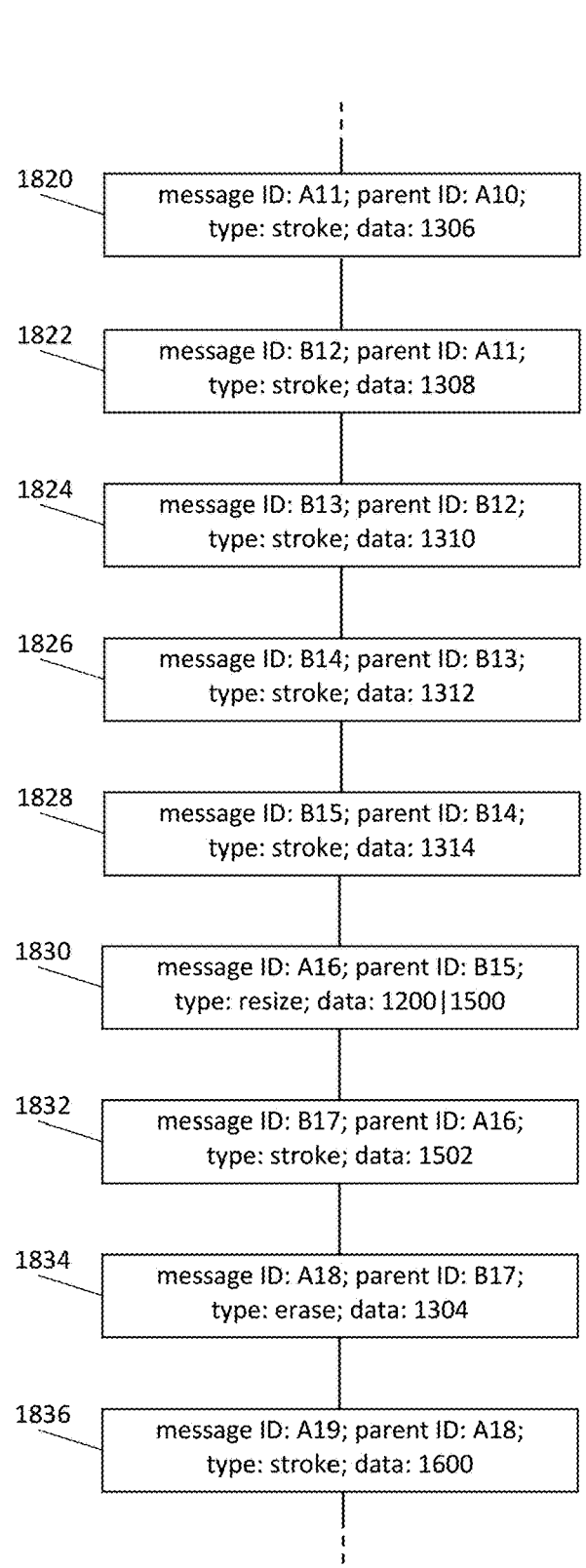
Figure 18D:
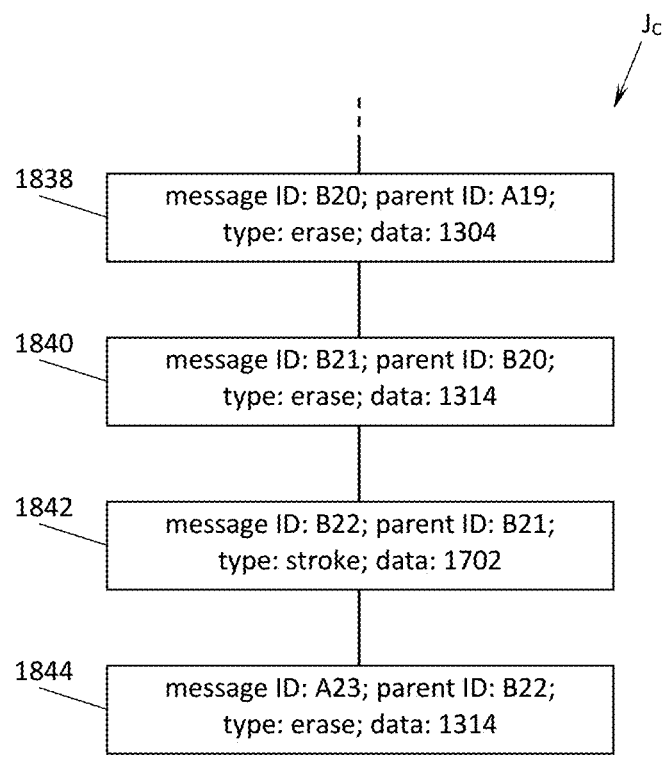

For example, the user of the third device 100 may have launched a document editing application on the device 100 and opened the document from a file directory or the like to which the device is connected via the network 12. In response, the document management system 112 of this third device reads the journal $J_A$ of the shared document $D_A$ and/or the journal $J_B$ of the shared document $D_B$ to construct its own document journal $J_C$ to build a document $D_C$, as shown in FIGS. 18B to 18D. That is, the journal $J_C$ is generated to include a chain of messages 1800 to 1844 with associated message and parent IDs and type and content information corresponding to the respective messages of the shared journal $J_A$ and/or $J_B$ that corresponds to the longest path through the message branches, such that the re-built journal does not contain any branches (until possible further indirect or direct conflict interaction input). As such, it can be seen that messages having the same parent ID which could otherwise cause conflicts in the building and re-building of the shared document are reconciled by only following the chain(s) having the earliest message ID in time-order.

Accordingly, from the journal $J_C$, the document $D_C$ is displayed on the display and input area 300 associated with the third device 100 to include the rendered digital ink 400 to 1702 which remains in the latest (current) version of the shared document, as provided by the message content of the shared journal(s) $J_A$ and/or $J_B$.

Figure 19A:
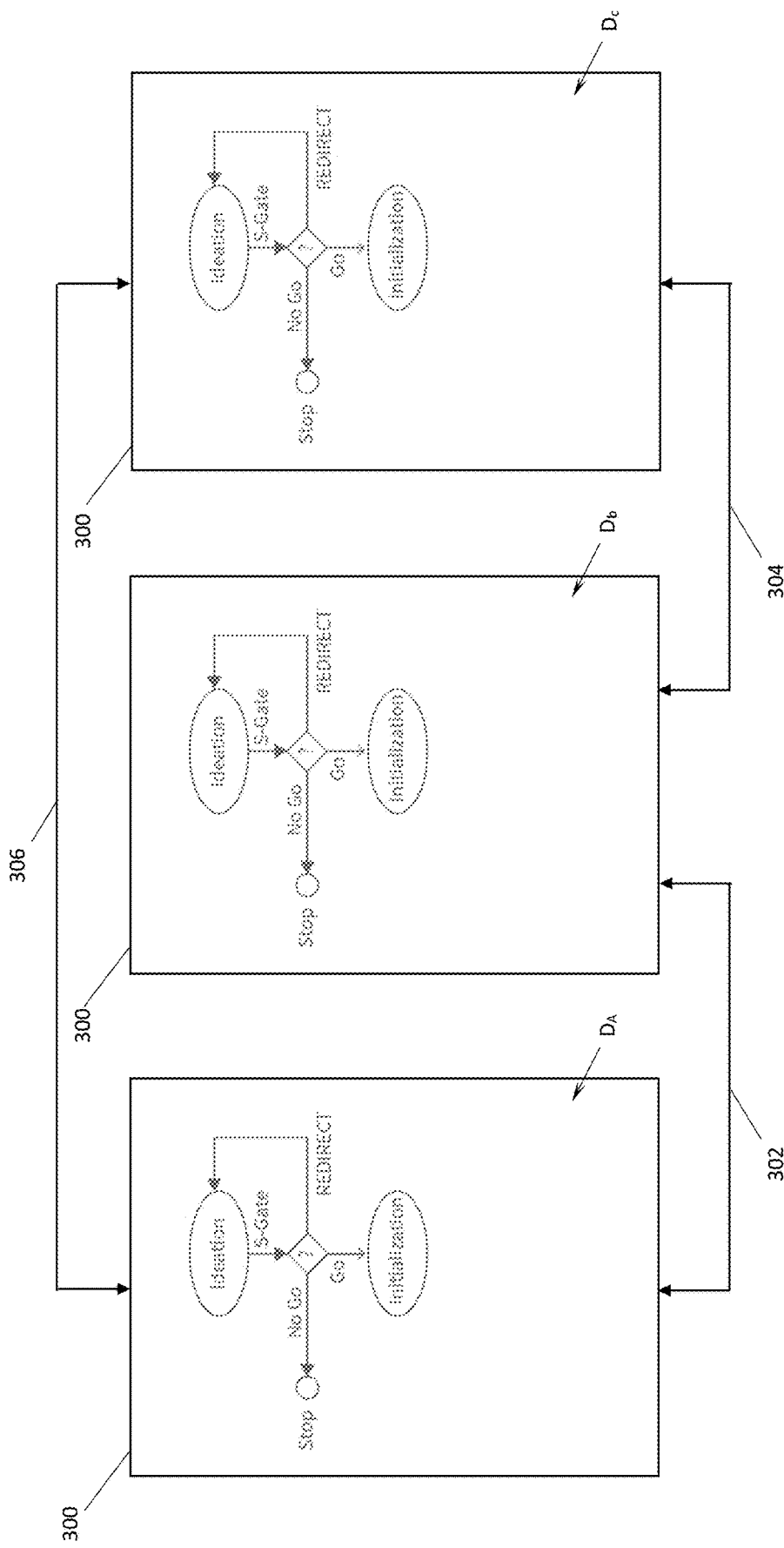
FIG. 19A shows the example documents of FIG. 18A having the digital ink rendered as typeset ink.

FIG. 19 illustrates the result of an example typesetting operation on the document $D_C$. That is, FIG. 19A shows the document $D_C$ upon a subsequent input to typeset the digital ink of the document Dc. Such an operation may involve the user performing a single-point or multi-point gesture, e.g., by a tap or double tap, somewhere on the user interface 104 of the third device 100 or through selection of menu or the like of the UI. The document management system 112 and/or the HWR system 114, is configured to recognize such a typeset command and to cause conversion of the digital ink into corresponding typeset ink, as shown in FIG. 19A. For example, this may be achieved as described in the afore-incorporated by reference U.S. patent application Ser. No. 14/955,155.

As a result, the journal $J_C$ is updated to include a subsequent message 1846, which is the twenty-fourth (subsequent) message of the journal, corresponding to the typesetting of all the digital ink. The message 1846 is generated to contain a message ID portion C24, a parent ID portion A23, a type portion "typeset", and a modification data portion specific for the typeset modification.

For the 'typeset' modification type, the modification data includes the content input that is being typeset. The content that is being typeset includes the identification of the 'stroke' data of that content. Accordingly, each actor receiving journal messages from other actors receives the identity of the strokes of the raw (and digital ink) that are being acted upon in the modification data. As such, the document management system 112 of the receiving actor(s) is able to re-render the corresponding displayed ink in their version of the shared document (in this typeset case, omitting that digital ink) and interaction with the rendered digital ink is substantially immediately possible, since they are ink objects, or digital objects.

Alternatively, or additionally, the 'typeset' modification data portion may include only the relative stroke coordinates which represent the raw ink of the typeset gesture. In such an alternative example the document management system 112 and/or HWR system 114 of each device 100 is required to recognition process the data portion of each message of a document journal when the messages are shared.

Further, the 'typeset' modification data portion may also include the message ID (and parent ID) of the 'stroke' type message originally associated with the strokes being typeset. In this way, links between the messages that modify other messages of the resulting journal can be deduced, which may assist in the detection of errors, for example.

The described modification data are examples and are non-exhaustive, such that it is understood that other or more data types (formats) can be provided in the document journal messages. In any case, as before, the 'stroke' data of the modification data may act as data to identify the strokes, e.g., one or more stroke IDs.

Figure 19B:
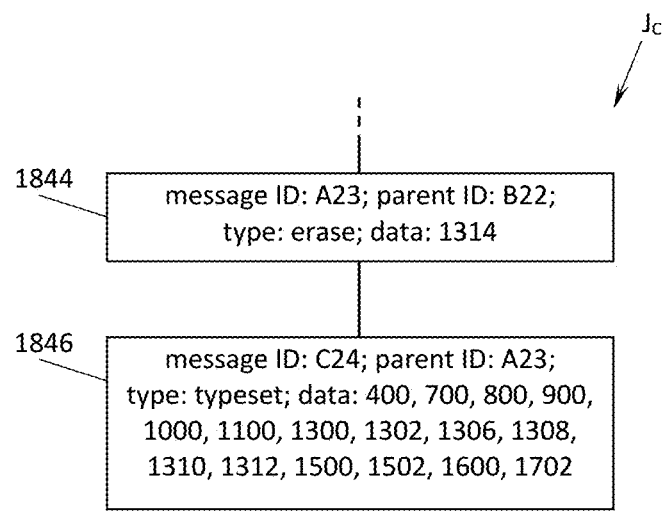
FIG. 19B show a portion of a document journals associated with the further example document of FIG. 19A in accordance with an example of the present system and method.

In the illustrated example, for the typeset message of journal $J_C$ the content input that is being typeset is designated in the modification data portion of the message 1846 by "400", "700", "800", "900", "1000", "1100", "1300", "1302", "1306", "1308", "1310", "1312", "1500", "1502", "1600" and "1702" being the raw and recognized content respectively represented by the digital ink 400, 700, 800, 900, 1000, 1100, 1300, 1302, 1306, 1308, 1310, 1312, 1500, 1502, 1600 and 1702 being typeset, as shown in FIG. 19B. As described earlier, the modification data portion of the message 1846 may also include the message IDs A1, A2, A3, A4, A5, A6, A8, A9, A11, B12, B13, B14, A16, B17, A19 and B22 and parent IDs "null", A1, A2, A3, A4, A5, B7, A8, A10, A11, B12, B13, B15, A16, A18 and B21, respectively, of the messages of the journal $J_C$ associated with the content 400, 700, 800, 900, 1000, 1100, 1300, 1302, 1306, 1308, 1310, 1312, 1500, 1502, 1600 and 1702.

In a situation where all of the documents $D_A$, $D_B$ and $D_C$ are open for editing or display by the respective first, second and third actors, and the devices 100 are connected by the links 302, 304 and 306 of the network 12, the update of the journal $J_C$ is communicated to the other actors. Accordingly, the renderings of the documents $D_A$ and $D_B$ are updated to include the typesetting of all digital ink, as shown in FIG.

19B, based on updates to the respective journals $J_A$ and $J_B$ to include a new message reflecting the shared message 1846 of the journal $J_C$.

Like the resize operation described earlier, the typeset operation may also be handled by the present system and method as a two step operation, having a first step of erasing, or otherwise removing from display, the strokes associated with the displayed digital ink and a second step of adding the removed digital ink rendered as typeset ink. In either case, the resulting display is the same. Further, the reverse operation of "untypeset" may be configured as either of these operations.

As described earlier, other modification operations are also handled by the present system and method. In each of these cases the generated messages include the message and parent IDs, and associated modification type and date portions. For example, for the 'move' modification type, the modification data includes reference to the strokes (e.g., content) being moved, and the extent of horizontal (e.g., x) and vertical (e.g., y) movement, for the 'style' modification type, the modification data includes reference to the strokes (e.g., content) being styled, and the style being applied, e.g., underline, bold, etc., and for the 'show; modification type, the modification includes a parameter of the content to show, such as popup parameter (e.g., recognition candidates) or a URL, an ID of the popup (so that it may be displayed with a particular style and selected for hiding with the reverse 'hide' commend, and the horizontal (e.g., x) and vertical (e.g., y) for display of the popup, for example. The application of these operations is through single- or multi-point gestures, menu selection, etc., similar to the manners discussed earlier for other command-type operations.

The operations of undo and redo are similarly applied through single- or multi-point gestures, menu selection, etc. The modification data for the messages associated with undo and redo may simply include the message ID of the message or block to which the undo or redo operation pertains. This message ID is basically the parent ID which is incrementally rolled backward upon multiple undo's and repeated for multiple redo's.

In the illustrated examples, the message IDs are provided as an incremental number, e.g., 1, 2, 3, etc., appended to a user or actor ID, e.g., A B or C. This is merely an example however, and only numbers (or other incremental elements, as described earlier) may be provided without identification of the user/actor which initially generated the message. However, by using the actor or author ID, it is possible to trace which member of a collaborative team made which modifications, for example, and to provide user editing privileges at the message level.

For example, the present system and method may be applied to an application in which one or more members of a collaborative team is required to have editing privileges that are greater than those of other member(s). Such an application is in education, where a teacher may be provided with the ability to edit the input of students, but the students are not provided with the ability to edit the input of the teacher. Another application is in document review, where a mediator is provided with greater editing abilities than the reviewers. These applications are merely examples and are non-exhaustive.

In such applications, the actor IDs can be pre-defined to each document management system of the relevant actors, e.g., in the associated memory 108 of the devices 100, with editing privileges over certain modification types, for example. As such, when building the respective journals using messages from their own and each other's journals, the document management systems apply or ignore certain actions taken by the actors when building the respective documents.

The document sharing model of the present system and method provides an efficient way of sharing handwritten ink and related content in real-time between different actors. In this model modification or editing information is stored in relatively small messages which can be generated without any synchronization mechanisms or centralized content handling. As such a shared document is managed as a series of modifications made by one or more different users on one or more peer-to-peer connected input devices, particularly handwritten modifications captured as digital ink and/or gestures by the devices. Each modification is stored in a journal entry with at least an identification, a type and information on the content of the modification. The content is a stroke, typeset content, extra-content or stroke manipulation, such as erase, move, style, resize.

Incremental versions of an ink document are therefore managed in a simple and accurate manner. Accuracy is enhanced to maintain control over the integrity of the ink document, by employing a model which defines conflicting modifications in a tree structure of the series of journal entries and auto-correcting to append entries that are not in the longest path of the journal. This resolves the journal tree into a single path for all actors with each entry linked to its parent.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for managing collaboration on documents having digital ink on a network of computing devices, each computing device comprising a processor and at least one non-transitory computer readable medium storing instructions that, when executed by the processor, cause the processor to:

cause display, on a display associated with the respective computing device, of a document having digital ink based on a journal of the document, the journal of the document being associated with a particular version of the document being displayed on the respective computing device;

define the journal to have a plurality of journal entries associated with at least handwriting input to the document represented by the digital ink; and communicate, via the network, one or more of the journal entries of the journal with one or more of the other computing devices displaying the document, wherein the one or more journal entries communicated via the network are used to build or re-build the document and an earlier version of the document on one or more of the other computing devices displaying the document, wherein the handwriting input associated with the journal entries is handwriting input to the document via the input interface of any of the computing devices displaying the document based on the communicated one or more journal entries, wherein the one or more other computing devices displaying the document store a separate journal of the document associated with a particular version of the document displayed on the one or more other computing devices, and wherein the processor of a first computing device is configured to:
  branch the journal into two or more branched journal entries linked to one journal entry having time information in a time-order before the time information of the branched journal entries when:
    the branched journal entries have content information on handwriting input to the input interface of more than one of the computing devices, including the first computing device, with respect to at least a portion of the same digital ink of the document; and
    the time information of the branched journal entry having the content information on the handwriting input to a first input interface associated with the first computing device has a time-order after the time information of at least one of the one or more other branched journal entries.

2. The system according to claim 1, wherein each journal entry is defined to include identification information identifying at least that journal entry and content information on at least the handwriting input associated with that journal entry.

3. The system according to claim 2, wherein the journal is defined so that links between the journal entries are formed based on the identification information of each journal entry.

4. The system according to claim 3, each processor configured to define the identification information based at least on time information on a time of the handwriting input of the respective content information,
  wherein each journal entry, after the initial journal entry of the journal, is linked to one journal entry having time information in a time-order before the time information of that journal entry.

5. The system according to claim 1, wherein the processor of the first computing device is configured to:
  link a copy of the branched journal entry having the content information on the handwriting input to the first input interface to a branched journal entry having time information in a time-order immediately before the time order of the copied branched journal entry.

6. A method for managing collaboration on documents having digital ink on a network of computing devices, each computing device comprising a processor and at least one non-transitory computer readable medium for processing handwriting input under control of the processor, the method comprising:
  displaying, on a display associated with one of the computing devices, a document having digital ink based on a journal of the document, the journal of the document being associated with a particular version of the document being displayed on the computing device;
  defining the journal to have a plurality of journal entries associated with at least handwriting input to the document represented by the digital ink; and
  communicating, via the network, one or more of the journal entries of the journal with one or more of the other computing devices displaying the document, wherein the one or more journal entries communicated via the network are used to build or re-build the document and an earlier version of the document on one or more of the other computing devices displaying the document, wherein the handwriting input associated with the journal entries is handwriting input to the document via the input interface of any of the computing devices displaying the document based on the communicated one or more journal entries, wherein the one or more other computing devices displaying the document store a separate journal of the document associated with a particular version of the document displayed on the one or more other computing devices, and wherein the method further comprises, at the at least one non-transitory computer readable medium of a first computing device:
  branching the journal into two or more branched journal entries linked to one journal entry having time information in a time-order before the time information of the branched journal entries when:
    the branched journal entries have content information on handwriting input to the input interface of more than one of the computing devices, including the first computing device, with respect to at least a portion of the same digital ink of the document; and
    the time information of the branched journal entry having the content information on the handwriting input to a first input interface associated with the first computing device has a time-order after the time information of at least one of the one or more other branched journal entries.

7. The method according to claim 6, wherein each journal entry is defined to include identification information identifying at least that journal entry and content information on at least the handwriting input associated with that journal entry.

8. The method according to claim 7, wherein the journal is defined so that links between the journal entries are formed based on the identification information of each journal entry.

9. The method according to claim 8, comprising:
  defining the identification information based at least on time information on a time of the handwriting input of the respective content information,
  wherein each journal entry, after the initial journal entry of the journal, is linked to one journal entry having time information in a time-order before the time information of that journal entry.

10. The method according to claim 6, comprising, at the at least one non-transitory computer readable medium of the first computing device:
  linking a copy of the branched journal entry having the content information on the handwriting input to the first input interface to a branched journal entry having time information in a time-order immediately before the time order of the copied branched journal entry.

11. A non-transitory computer readable medium having a computer readable program code embodied therein, said computer readable program code adapted to be executed to implement a method for managing collaboration on documents having digital ink on a network of computing devices, each computing device comprising a processor and at least one non-transitory computer readable medium for processing handwriting input under control of the processor, the method comprising:

displaying, on a display associated with one of the computing devices, a document having digital ink based on a journal of the document, the journal of the document being associated with a particular version of the document being displayed on the computing device;

defining the journal to have a plurality of journal entries associated with at least handwriting input to the document represented by the digital ink; and communicating, via the network, one or more of the journal entries of the journal with one or more of the other computing devices displaying the document, wherein the one or more journal entries communicated via the network are used to build or re-build the document and an earlier version of the document on one or more of the other computing devices displaying the document, wherein the handwriting input associated with the journal entries is handwriting input to the document via the input interface of any of the computing devices displaying the document based on the communicated one or more journal entries, and wherein the one or more other computing devices displaying the document store a separate journal of the document associated with a particular version of the document displayed on the one or more other computing devices, wherein the method comprises, at a first computing device:

branching the journal into two or more branched journal entries linked to one journal entry having time information in a time-order before the time information of the branched journal entries when:

the branched journal entries have content information on handwriting input to the input interface of more than one of the computing devices, including the first computing device, with respect to at least a portion of the same digital ink of the document; and the time information of the branched journal entry having the content information on the handwriting input to a first input interface associated with the first computing device has a time-order after the time information of at least one of the one or more other branched journal entries.

12. The non-transitory computer readable medium according to claim 11, wherein each journal entry is defined to include identification information identifying at least that journal entry and content information on at least the handwriting input associated with that journal entry.

13. The non-transitory computer readable medium according to claim 12, wherein the journal is defined so that links between the journal entries are formed based on the identification information of each journal entry.

14. The non-transitory computer readable medium according to claim 13, the method comprising:

defining the identification information based at least on time information on a time of the handwriting input of the respective content information, wherein each journal entry, after the initial journal entry of the journal, is linked to one journal entry having time information in a time-order before the time information of that journal entry.

15. The non-transitory computer readable medium according to claim 11, the method comprising, at the first computing device:

linking a copy of the branched journal entry having the content information on the handwriting input to the first input interface to a branched journal entry having time information in a time-order immediately before the time order of the copied branched journal entry.

\* \* \* \* \*